(12) United States Patent
Munetsugu et al.

(10) Patent No.: US 7,627,686 B2
(45) Date of Patent: *Dec. 1, 2009

(54) MEDIA CONTENTS DISTRIBUTION SYSTEM AND METHOD

(75) Inventors: Toshihiko Munetsugu, Katano (JP); Kazuhiro Nishitani, Osaka (JP); Kazuo Kajimoto, Yokohama (JP); Yoshiaki Iwata, Moriguchi (JP); Kentaro Tanikawa, Kadoma (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/826,179

(22) Filed: Jul. 12, 2007

(65) Prior Publication Data

US 2007/0266171 A1    Nov. 15, 2007

Related U.S. Application Data

(62) Division of application No. 10/310,931, filed on Dec. 6, 2002, now Pat. No. 7,305,484.

(30) Foreign Application Priority Data

Dec. 7, 2001    (JP)    ............................. 2001-374315

(51) Int. Cl.
*G06F 15/16* (2006.01)
(52) U.S. Cl. .................. 709/231; 709/200; 709/201
(58) Field of Classification Search ................. 709/231, 709/200, 201; 370/231
See application file for complete search history.

(56) References Cited

U.S. PATENT DOCUMENTS 5,848,352 A * 12/1998 Dougherty et al. .......... 725/110

(Continued)

FOREIGN PATENT DOCUMENTS

EP    0 907 285    4/1999

(Continued)

OTHER PUBLICATIONS

C. Kagami, "Matryoshka—An Autonomous Capsule for Content Usage Management", Information Processing Society of Japan, Mar. 22, 2000, vol. 2000, pp. 99-104, with partial English translation.

(Continued)

*Primary Examiner*—Frantz B Jean
(74) *Attorney, Agent, or Firm*—Wenderoth, Lind & Ponack, L.L.P.

(57) ABSTRACT

A server stores a media content and an execution program for processing the media content, and determines a usage rule for the media content to be transmitted to a terminal. The server distributes the usage rule, the media content, and the execution program to the terminal. The terminal stores the distributed usage rule, media content, and execution program. The terminal executes the stored execution program and processes the stored media content within the bounds of the usage rule as stored. The server may perform a billing process in accordance with the determined usage rule, or select and distribute a media content or an execution program in accordance with the processing ability of the terminal or a state of communications. Moreover, the server may distribute, in addition to the execution program, middleware for constructing an operating environment for the execution program.

12 Claims, 31 Drawing Sheets

U.S. PATENT DOCUMENTS

| | | | |
|---|---|---|---|
| 6,735,633 B1 * | 5/2004 | Welch et al. | 709/233 |
| 2003/0088686 A1 * | 5/2003 | Jennings | 709/231 |

FOREIGN PATENT DOCUMENTS

| | | |
|---|---|---|
| EP | 0 909 095 | 4/1999 |
| EP | 0 954 179 | 11/1999 |
| JP | 09-138827 | 5/1997 |
| JP | 2000-113066 | 4/2000 |
| JP | 2001-290671 | 10/2001 |
| WO | 99/57905 | 11/1999 |
| WO | 01/31924 | 5/2001 |
| WO | 01/76245 | 10/2001 |
| WO | 0176245 A2 * | 10/2001 |
| WO | 01/97588 | 12/2001 |
| WO | 02-21874 | 3/2002 |

OTHER PUBLICATIONS

N. Sakurai, "Integrated Contents Information Management/Technology of Practical Use: From date base to information base", NTT Technical Review, vol. 12, No. 4, The Telecommunications Association, Apr. 1, 2000, vol. 12, pp. 26-29, with partial English translation.

* cited by examiner

```
<UsageRule>
 <ContentsID>Co0001</ContentsID>
 <UserID>User0001</UserID>
 <UserProgramID>Pro0001</UserProgramID>
 <Permission action="Replay">
    <Section>
       <From>00:00:00.00</From>
       <Until>00:30:00.00</Until>
    </Section>
    <Times>3</Times>
    <Period>
       <From>2001/10/10</From>
       <Until>2001/10/16</Until>
    </Period>
 </Permission>
</UsageRule>
```

FIG. 7

```
<History>
 <ContentsID>Co0001</ContentsID>
 <UserProgramID>Pro0001</UserProgramID>
 <AccessLog action="Replay">
    <Times>1</Times>
    <AccessDate>2001/10/11 20:30 JST</AccessDate>
 </AccessLog>
</History>
```

FIG. 34

| ABILITY / FUNCTION | PC | MOBILE PHONE | STB | PDA | ••• |
|---|---|---|---|---|---|
| PLAYBACK | Program11 | Program12 | Program13 | Program14 | ••• |
| PLAYBACK + DUPLICATION | Program21 | — | Program23 | — | ••• |
| DUPLICATION | Program31 | — | Program33 | — | ••• |
| EDITING | Program41 | — | — | — | ••• |
| ⋮ | ⋮ | ⋮ | ⋮ | ⋮ | ⋮ |

FIG. 35

| ENCODING METHOD / CONTENT ID | MPEG2 HIGH BIT-RATE | MPEG2 LOW BIT-RATE | MPEG4 HIGH BIT-RATE | MPEG4 LOW BIT-RATE |
|---|---|---|---|---|
| Co0001 | Contents1-2H.mpg | Contents1-2L.mpg | Contents1-4H.mp4 | Contents1-4L.mp4 |
| Co0002 | Contents2-2H.mpg | Contents2-2L.mpg | Contents2-4H.mp4 | Contents2-4L.mp4 |
| Co0003 | Contents3-2H.mpg | Contents3-2L.mpg | Contents3-4H.mp4 | Contents3-4L.mp4 |
| ⋮ | ⋮ | ⋮ | ⋮ | ⋮ |

US 7,627,686 B2

MEDIA CONTENTS DISTRIBUTION SYSTEM AND METHOD

This is a divisional application of U.S. patent application Ser. No. 10/310,931, filed Dec. 6, 2002, now issued as U.S. Pat. No. 7,305,484.

BACKGROUND OF THE INVENTION

1. Field of the Invention

The present invention relates to a media contents distribution system, and more particularly to a system for distributing a multimedia content containing video data and/or audio data to users, while preventing unauthorized use thereof.

2. Description of the Background Art

In recent years, network systems have been developed as part of the social infrastructure, and consequently, multimedia contents containing digital data such as images, moving pictures, and audio are widely spread via such networks. Moreover, large-capacity recording media have been developed, making it possible to distribute multimedia contents via such recording media. Digital data is easy to preserve and duplicate, and does not deteriorate in quality through preservation or duplication. As a result, if unauthorized preservation or duplication of media contents containing digital data is committed by a recipient, the rights of the author of such media contents are infringed, thus detracting from the profit of the provider of the media contents. In order to prevent this situation, when distributing any media content containing digital data, it is necessary to impose certain limitations on the use of the media content by users.

Conventionally, the limitation on the use of media contents has been realized by, for example, encrypting digital data. Another alternative has been to ensure that a user makes an agreement concerning the use of a media content at the time of purchasing the media content, after which the limitation on the use of the media content is left up to the conscience of the user.

However, even if digital data is encrypted, a decryption key for decrypting the encrypted digital data may be stolen, so that it is still impossible to completely prevent unauthorized preservation or duplication of media contents by the recipients. Any agreement directed to the limitation of the use of a media content cannot guarantee that the agreement will be abided by.

A multimedia content is characterized in that, once purchased, it can be played back or viewed an unlimited number of times, substantially perpetually. On the other hand, from the perspective of the user, some media contents are only needed for a certain period of time and never again thereafter. In particular, as the amount of a single media content increases, which is currently the case, the data which is really needed by a user may often be only a part of the purchased media content. Even in such cases, however, the user is still paying a fee which often far exceeds what should be the real price in view of the extent to which the user has actually used the media content.

Therefore, from the perspective of the provider of a media content, a system is desired which can effectively limit the use of a media content by a user; and from the perspective of the user, a system is desired which only requires the user to pay a price according to the extent to which the user has actually used the media content, in exchange for somewhat limited usage. There have not been known any such systems to date.

SUMMARY OF THE INVENTION

Therefore, an object of the present invention is to provide a media contents distribution system which can effectively limit the use of a media content by a user. Another object of the present invention is to provide a media contents distribution system which is capable of billing a user in such a manner that the user only needs to pay a price according to the extent to which the user has actually used a media content.

The present invention has the following features to attain the above-described objects.

A first aspect of the present invention is directed to a media contents distribution system for distributing a media content via a communication network, where the system comprises a server and a terminal. The server comprises: a server-side storage unit operable to store a media content and an execution program for processing the media content; a transmission unit operable to transmit the media content and the execution program stored in the server-side storage unit to the terminal; and a condition setting unit operable to determine a usage rule for the media content to be transmitted to the terminal. The terminal comprises: a reception unit operable to receive the media content and the execution program from the server; a terminal-side storage unit operable to at least store the execution program received by the reception unit; a control unit operable to permit use of the media content within the bounds of the usage rule determined by the condition setting unit; and a processing unit operable to, as permitted by the control unit, execute the execution program stored in the terminal-side storage unit, and process the media content received by the reception unit.

According to the first aspect, the server determines a usage rule for the media content to be transmitted to the terminal, and the terminal executes the distributed execution program within the bounds of the usage rule determined at the server, thereby processing the distributed media content. In other words, the terminal processes the media content within the bounds of the usage rule determined by the server. As a result, the use of the media content by a user can be effectively limited.

In a second aspect based on the first aspect, the media content stored in the server-side storage unit comprises video data and/or audio data, and the condition setting unit determines the usage rule in terms of a mode of use at least including playback.

According to the second aspect, copyrights to a multimedia content containing video data and/or audio data can be protected.

In a third aspect based on the first aspect, prior to using the media content, the transmission unit transmits the media content and the execution program stored in the server-side storage unit and the usage rule determined by the condition setting unit to the terminal, and the reception unit receives the media content, the execution program and the usage rule from the server. The terminal-side storage unit stores the media content, the execution program and the usage rule received by the reception unit, at a time of using the media content, the control unit permits use of the media content in accordance with the usage rule stored in the terminal-side storage unit, and the processing unit processes the media content stored in the terminal-side storage unit.

According to the third aspect, the media content, the execution program, and the usage rule are distributed from the server to the terminal, and are thereafter kept under management at the terminal.

In a fourth aspect based on the third aspect, when the condition setting unit determines a new usage rule for the media content stored in the terminal-side storage unit, the transmission unit transmits the new usage rule determined by the condition setting unit to the terminal, the reception unit receives the new usage rule from the server, and the terminal-side storage unit updates the usage rule stored therein with the new usage rule received by the reception unit.

According to the fourth aspect, the usage rule for the media content can be changed at an arbitrary point in time.

In a fifth aspect based on the third aspect, when a new execution program is needed for using the media content at the terminal, the condition setting unit determines a new usage rule for the media content stored in the terminal-side storage unit, and the transmission unit transmits the new execution program stored in the server-side storage unit and the new usage rule determined by the condition setting unit to the terminal. The reception unit receives the new execution program and the new usage rule from the server, and the terminal-side storage unit updates the execution program and the usage rule stored therein with the new execution program and the new usage rule received by the reception unit, respectively.

According to the fifth aspect, if another execution program becomes needed for the use of the media content at the terminal, the other execution program is distributed from the server to the terminal, and the execution program stored in the terminal is updated with the other execution program distributed from the server.

In a sixth aspect based on the first aspect, the server-side storage unit further stores the usage rule determined by the condition setting unit. The transmission unit transmits the media content and the execution program stored in the server-side storage unit to the terminal prior to using the media content, and at a time of using the media content, transmits the usage rule stored in the server-side storage unit to the terminal. The reception unit receives the media content, the execution program and the usage rule from the server, and the terminal-side storage unit stores the media content and the execution program received by the reception unit. The control unit permits use of the media content in accordance with the usage rule received by the reception unit at the time of using the media content, and the processing unit processes the media content stored in the terminal-side storage unit.

According to the sixth aspect, the media content and the execution program are distributed from the server to the terminal, and are thereafter kept under management at the terminal, whereas the usage rule is kept under management at the server. As a result, the tampering of the usage rule at the terminal can be prevented.

In a seventh aspect based on the sixth aspect, when the condition setting unit determines a new usage rule for the media content stored in the terminal-side storage unit, the server-side storage unit updates the usage rule stored therein with the new usage rule determined by the condition setting unit.

According to the seventh aspect, the usage rule for the media content can be changed at an arbitrary point in time.

In an eighth aspect based on the sixth aspect, when a new execution program is needed for using the media content at the terminal, the condition setting unit determines a new usage rule for the media content stored in the terminal-side storage unit, and the server-side storage unit updates the usage rule stored therein with the new usage rule determined by the condition setting unit, the transmission unit transmits the new execution program stored in the server-side storage unit to the terminal. The reception unit receives the new execution program from the server, and the terminal-side storage unit updates the execution program stored therein with the new execution program received by the reception unit.

According to the eighth aspect, if another execution program becomes needed for the use of the media content at the terminal, the other execution program is distributed from the server to the terminal, and the execution program stored in the terminal is updated with the other execution program distributed from the server.

In a ninth aspect based on the first aspect, the transmission unit transmits the execution program stored in the server-side storage unit and the usage rule determined by the condition setting unit to the terminal prior to using the media content, and transmits the media content stored in the server-side storage unit to the terminal during use of the media content. The reception unit receives the media content, the execution program and the usage rule from the server, the terminal-side storage unit stores the execution program and the usage rule received by the reception unit, at a time of using the media content, the control unit permits use of the media content in accordance with the usage rule stored in the terminal-side storage unit, and the processing unit processes the media content received by the reception unit concurrently as the reception unit receives the media content.

According to the ninth aspect, the execution program and the usage rule are distributed from the server to the terminal, and are thereafter kept under management at the terminal, whereas the media content is kept under management at the server. In this case, the terminal keeps processing the media content while receiving the media content from the server. As a result, it becomes possible to prevent unauthorized duplication of the media content at the terminal.

In a tenth aspect based on the ninth aspect, when the condition setting unit determines a new usage rule for the media content to be transmitted to the terminal, the transmission unit transmits the new usage rule determined by the condition setting unit to the terminal, the reception unit receives the new usage rule from the server, and the terminal-side storage unit updates the usage rule stored therein with the new usage rule received by the reception unit.

According to the tenth aspect, the usage rule for the media content can be changed at an arbitrary point in time.

In an eleventh aspect based on the ninth aspect, when a new execution program is needed for using the media content at the terminal, the condition setting unit determines a new usage rule for the media content to be transmitted to the terminal, and the transmission unit transmits the new execution program stored in the server-side storage unit and the new usage rule determined by the condition setting unit to the terminal. The reception unit receives the new execution program and the new usage rule from the server, and the terminal-side storage unit updates the execution program and the usage rule stored therein with the new execution program and the new usage rule received by the reception unit, respectively.

According to the eleventh aspect, if another execution program becomes needed for the use of the media content at the terminal, the other execution program is distributed from the server to the terminal, and the execution program stored in the terminal is updated with the other execution program distributed from the server.

In a twelfth aspect based on the first aspect, the server-side storage unit further stores the usage rule determined by the condition setting unit, and the transmission unit transmits the execution program stored in the server-side storage unit to the terminal prior to using the media content, transmits the usage rule stored in the server-side storage unit to the terminal at a time of using the media content, and transmits the media content stored in the server-side storage unit to the terminal during use of the media content. The reception unit receives the media content, the execution program and the usage rule from the server, and the terminal-side storage unit stores the execution program received by the reception unit. The control unit permits use of the media content in accordance with the usage rule received by the reception unit at the time of using the media content, and the processing unit processes the media content received by the reception unit concurrently as the reception unit receives the media content.

According to the twelfth aspect, the execution program is distributed from the server to the terminal, and is thereafter kept under management at the terminal, whereas the media content and the usage rule are kept under management at the server. In this case, the terminal keeps processing the media content while receiving the media content from the server. As a result, it becomes possible to prevent unauthorized duplication of the media content or tampering of the usage rules at the terminal.

In a thirteenth aspect based on the twelfth aspect, when the condition setting unit determines a new usage rule for the media content to be transmitted to the terminal, the server-side storage unit updates the usage rule stored therein with the new usage rule determined by the condition setting unit.

According to the thirteenth aspect, the usage rule for the media content can be changed at an arbitrary point in time.

In a fourteenth aspect based on the twelfth aspect, when a new execution program is needed for using the media content at the terminal, the condition setting unit determines a new usage rule for the media content to be transmitted to the terminal, the server-side storage unit updates the usage rule stored therein with the new usage rule determined by the condition setting unit, and the transmission unit transmits the new execution program stored in the server-side storage unit to the terminal. The reception unit receives the new execution program from the server, and the terminal-side storage unit updates the execution program stored therein with the new execution program received by the reception unit.

According to the fourteenth aspect, if another execution program becomes needed for the use of the media content at the terminal, the other execution program is distributed from the server to the terminal, and the execution program stored in the terminal is updated with the other execution program distributed from the server.

In a fifteenth aspect based on the first aspect, the server further comprises a billing unit operable to perform a billing process for the terminal in accordance with the usage rule determined by the condition setting unit.

According to the fifteenth aspect, the server charges the terminal with a fee which is in accordance with the usage rule. As a result, the user of the terminal only needs to pay a fee according to the extent to which the user has actually used the media content.

In a sixteenth aspect based on the first aspect, the server-side storage unit further stores middleware for constructing an operating environment for the execution program stored in the terminal-side storage unit, and the transmission unit further transmits the middleware stored in the storage unit to the terminal. The reception unit further receives the middleware from the server, and the terminal-side storage unit at least stores the execution program and the middleware received by the reception unit. Under the operating environment constructed by the middleware stored in the terminal-side storage unit, the processing unit executes the execution program stored in the terminal-side storage unit and processes the media content received by the reception unit.

According to the sixteenth aspect, if it is impossible to execute the execution program at the terminal, middleware which is compatible with the hardware and/or OS (operating system) employed at the terminal is distributed from the server to the terminal. As a result, in spite of a diversity in hardware and/or OS, etc., it becomes possible to execute the execution program and process the media content at various types of terminals.

In a seventeenth aspect based on the first aspect, the server-side storage unit stores a plurality of the execution programs providing the same function but requiring different levels of processing ability. The transmission unit selects one of the plurality of execution programs stored in the server-side storage unit in accordance with a processing ability of the terminal, and transmits the selected execution program to the terminal.

According to the seventeenth aspect, an execution program which is optimally selected in accordance with the processing ability of the terminal can be distributed from the server to the terminal.

In an eighteenth aspect based on the first aspect, the server-side storage unit stores a plurality of media contents directed to the same substance but requiring different levels of processing ability. The transmission unit selects one of the plurality of media contents stored in the server-side storage unit in accordance with a processing ability of the terminal, and transmits the selected media content to the terminal.

According to the eighteenth aspect, a media content which is optimally selected in accordance with the processing ability of the terminal can be distributed from the server to the terminal.

In a nineteenth aspect based on the first aspect, the server-side storage unit stores a plurality of media contents directed to the same substance but differing in data amount per unit time. The transmission unit selects one of the plurality of media contents stored in the server-side storage unit in accordance with a state of communications occurring between the server and the terminal, and transmits the selected media content to the terminal.

According to the nineteenth aspect, a media content which is optimally selected in accordance with a state of communications can be distributed from the server to the terminal.

In a twentieth aspect based on the first aspect, the media contents distribution system comprises a plurality of the terminals, the usage rule determined by the condition setting unit contains identification information of at least one of the plurality of terminals to which the media content is available, and the control unit permits use of the media content if the identification information of the terminal is contained in the usage rule determined by the condition setting unit.

According to the twentieth aspect, it becomes possible to allow the distributed media content to be used only at specific terminals.

In a twenty-first aspect based on the first aspect, the usage rule determined by the condition setting unit contains an allowable section for use of the media content to be transmitted to the terminal, and the control unit permits use of the media content received by the reception unit only with respect to the allowable section for use contained in the usage rule determined by the condition setting unit.

According to the twenty-first aspect, it becomes possible to allow only a specific section of the distributed media content to be used by a user.

In a twenty-second aspect based on the first aspect, the terminal further comprises a history storage unit operable to store a processing history in the processing unit, and the usage rule determined by the condition setting unit contains an allowable number of times of use for the media content to be transmitted to the terminal. The control unit permits use of the media content until the allowable number of times of use contained in the usage rule determined by the condition setting unit is reached, by referring to the processing history stored in the history storage unit.

According to the twenty-second aspect, it becomes possible to limit the number of times that the distributed media content can be used.

In a twenty-third aspect based on the first aspect, the terminal further comprises a history storage unit operable to store a processing history in the processing unit, and the usage rule determined by the condition setting unit contains an allowable total time of use for the media content to be transmitted to the terminal. The control unit permits use of the media content until the allowable total time of use contained in the usage rule determined by the condition setting unit is reached, by referring to the processing history stored in the history storage unit.

According to the twenty-third aspect, it becomes possible to limit the amount of time that the distributed media content can be used.

In a twenty-fourth aspect based on the first aspect, the usage rule determined by the condition setting unit contains an allowable period of use for the media content to be transmitted to the terminal, and the control unit permits use of the media content if a current time falls within the allowable period of use contained in the usage rule determined by the condition setting unit.

According to the twenty-fourth aspect, it becomes possible to limit the period of time that the distributed media content can be used.

In a twenty-fifth aspect based on the first aspect, the server-side storage unit stores the media content in an encrypted state, and the transmission unit transmits the media content stored in the server-side storage unit to the terminal in the encrypted state. The reception unit receives the media content from the server in the encrypted state, and the processing unit decrypts and processes the media content received by the reception unit.

According to the twenty-fifth aspect, the media content is encrypted, and the terminal decrypts the media content within the bounds of the usage rule. As a result, the use of the media content by a user can be limited more effectively.

In a twenty-sixth aspect based on the second aspect, the processing unit plays back the media content received by the reception unit.

According to the twenty-sixth aspect, a user is allowed to play back the media content within the bounds of the usage rule.

In a twenty-seventh aspect based on the second aspect, the processing unit duplicates the media content received by the reception unit.

According to the twenty-seventh aspect, a user is allowed to duplicate the media content within the bounds of the usage rule.

In a twenty-eighth aspect based on the second aspect, the processing unit edits the media content received by the reception unit.

According to the twenty-eighth aspect, a user is allowed to edit the media content within the bounds of the usage rule.

A twenty-ninth is directed to a terminal for receiving a media content distributed from a server via a communication network. The terminal comprises: a reception unit operable to receive a media content and an execution program from the server; a storage unit operable to at least store the execution program received by the reception unit; a control unit operable to permit use of the media content within the bounds of a usage rule determined by the server; and a processing unit operable to, as permitted by the control unit, execute the execution program stored in the storage unit, and process the media content received by the reception unit.

According to the twenty-ninth aspect, a terminal for use in the media contents distribution system according to the first aspect can be provided.

A thirtieth is directed to a media content distribution method for distributing a media content from a server to a terminal via a communication network. The method comprises: a step, performed by the server, of storing a media content and an execution program for processing the media content; a step, performed by the server, of transmitting the stored media content and execution program to the terminal; and a step, performed by the server, of determining a usage rule for the media content to be transmitted to the terminal. Further, the method comprises: a step, performed by the terminal, of receiving the media content and the execution program from the server; a step, performed by the terminal, of at least storing the received execution program; a step, performed by the terminal, of permitting use of the media content within the bounds of the usage rule determined by server; and a step, performed by the terminal, of executing the stored execution program and processing the received media content, as permitted by the step of permitting use of the media content.

According to the thirtieth aspect, the server determines a usage rule for the media content to be transmitted to the terminal, and the terminal executes the distributed execution program within the bounds of the usage rule determined at the server, thereby processing the distributed media content. In other words, the terminal processes the media content within the bounds of the usage rule determined by the server. As a result, the use of the media content by a user can be effectively limited.

A thirty-first is directed to an encapsulated data distributed from a server to a terminal via a communication network. The encapsulated data comprises: a media content; an execution program for processing the media content; and a usage rule, determined by the server with respect to the media content, for the terminal to execute the execution program and process the media content.

According to the thirty-first aspect, data to be transmitted from the server to the terminal in the media contents distribution system according to the third aspect can be provided.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows an example of a processing history employed in the media contents distribution system shown in FIG. 1;

FIG. 34 illustrates a table of execution programs employed in the media contents distribution system according to the seventh embodiment of the present invention; and FIG. 35 illustrates a table of media contents employed in the media contents distribution system according to the seventh embodiment of the present invention.

DETAILED DESCRIPTION OF THE PREFERRED EMBODIMENTS

First Embodiment

Figure 1:
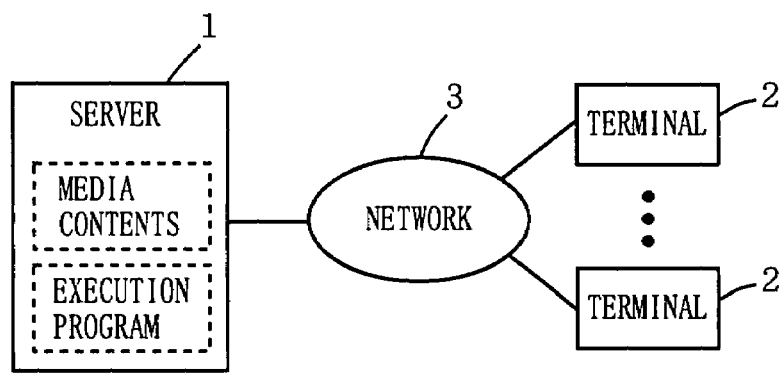
FIG. 1 is a block diagram illustrating the structure of a media contents distribution system according to first to seventh embodiments of the present invention.

FIG. 1 is a block diagram illustrating the structure of a media contents distribution system according to a first embodiment of the present invention. The media contents distribution system shown in FIG. 1 comprises a server 1 and a plurality of terminals 2. The server 1 and each terminal 2 are connected to each other via a network 3 so as to be capable of communicating with each other. The server 1 stores media contents and execution programs for processing the media contents. The server 1 distributes a media content and an execution program to each terminal 2 via the network 3. Each terminal 2 executes the distributed execution program to process the distributed media content.

The use of the media content by the user of the terminal 2 has certain limitations. In order to realize such limited usage, a usage rule is set for each media content distributed from the server 1, such that the terminal 2 is allowed to process the media content within the bounds of the usage rule. More preferably, the media content is encrypted in advance, and each terminal 2 decrypts the encrypted media content and processes the decrypted media content within the bounds of the usage rule. A key for decrypting the media content may be, for example, previously notified by an administrator of the server 1 to the user of each terminal 2, and stored in the terminal 2. Alternatively, a key may be provided from the server 1 to each terminal 2 at the same time that an execution program is provided (e.g., as embedded in the execution program).

A media content which is distributed from the server 1 may be video data and audio data, e.g., a movie, a sport program, or a music concert program, or audio data, e.g., a music album. One media content corresponds to a single movie or music album, for example. As used herein, the "use" of a media content refers to the playback, duplication, or editing of a media content, for example. Examples of execution programs for processing a media content include a media content playback program, a media content duplication program, and a media content editing program. Note that the media content is not limited to video data and audio data, but may also be a program, e.g., game software or application software.

A usage rule which is set for a media content includes, for example, an identifier representing a user who is allowed to use that media content, and an allowable number of times of use for that media content (e.g., the media content may be allowed to be used up to three times). Instead of an allowable number of times of use, the usage rule may include an allowable total time of use (e.g., the media content may be allowed to be used up to five hours), or an allowable period of use (e.g., the media content may be allowed to be used from Oct. 10, 2001 until Oct. 16, 2001). Alternatively, the usage rule may include any two or all of an allowable number of times of use, an allowable total time of use, and an allowable period of use. Moreover, the usage rule may be set for a portion of the media content, rather than the entire media content. In this case, the usage rule will further include an allowable section for use (e.g., only the first thirty minutes of the media content may be allowed to be used). Capsulated data (hereinafter referred to as a "capsule") containing a media content, an execution program, and a usage rule is distributed from the server 1 to each terminal 2. The details of the capsule will be described later with reference to FIG. 5.

Figure 2:
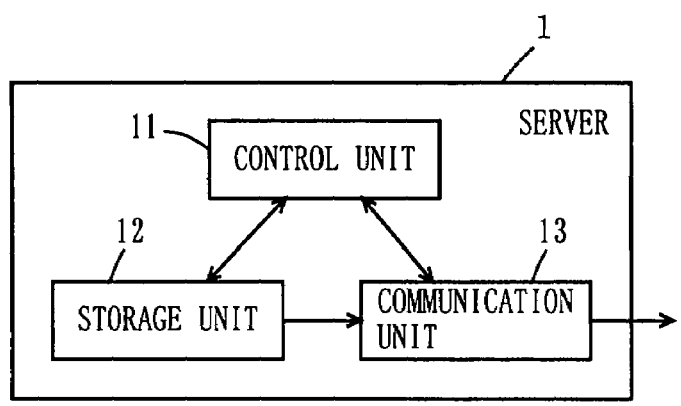
FIG. 2 is a block diagram illustrating the detailed structure of a server shown in FIG. 1.

FIG. 2 is a block diagram illustrating the detailed structure of the server 1. As shown in FIG. 2, the server 1 includes a control unit 11, a storage unit 12, and a communication unit 13. The control unit 11 may include, for example, a CPU, a RAM, and a ROM. A server-controlling program is stored in the ROM. The functions of the server 1 (described later) are realized by the CPU executing the server-controlling program, with the RAM being employed as a memory area. The storage unit 12 may be composed of, for example, a recording medium such as a hard disk, and a drive device therefor. The communication unit 13 is composed of a network connecting device, e.g., a modem or a terminal adapter.

Figure 3:
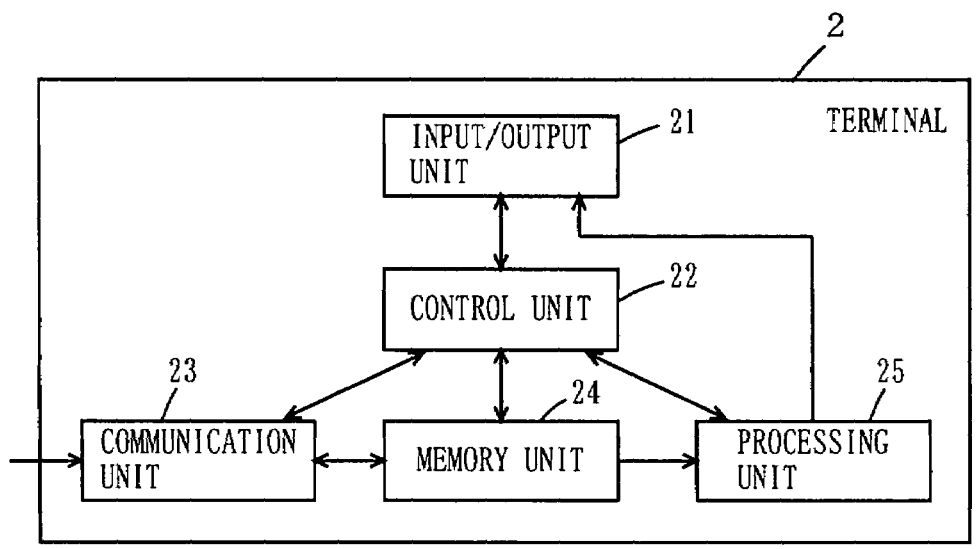
FIG. 3 is a block diagram illustrating the detailed structure of a terminal shown in FIG. 1.

FIG. 3 is a block diagram illustrating the detailed structure of the terminal 2. As shown in FIG. 3, the terminal 2 includes an input/output unit 21, a control unit 22, a communication unit 23, a memory unit 24, and a processing unit 25. The input/output unit 21 may be composed of, for example, an input device, e.g., a keyboard and/or a touch panel, and an output device, e.g., a display and/or loudspeakers. The control unit 22 may include, for example, a CPU, a RAM, and a ROM. A terminal-controlling program is stored in the ROM. The functions of the terminal 2 (described later) are realized by the CPU executing the terminal-controlling program, with the RAM being employed as a memory area. The communication unit 23 may be composed of, for example, a network connecting device such as a modem or a terminal adapter. The memory unit 24 may be composed of, for example, a recording medium such as a semiconductor memory. The processing unit 25 may be composed of circuits for processing video data and/or audio data, e.g., a graphics board and/or a sound board.

Figure 4:
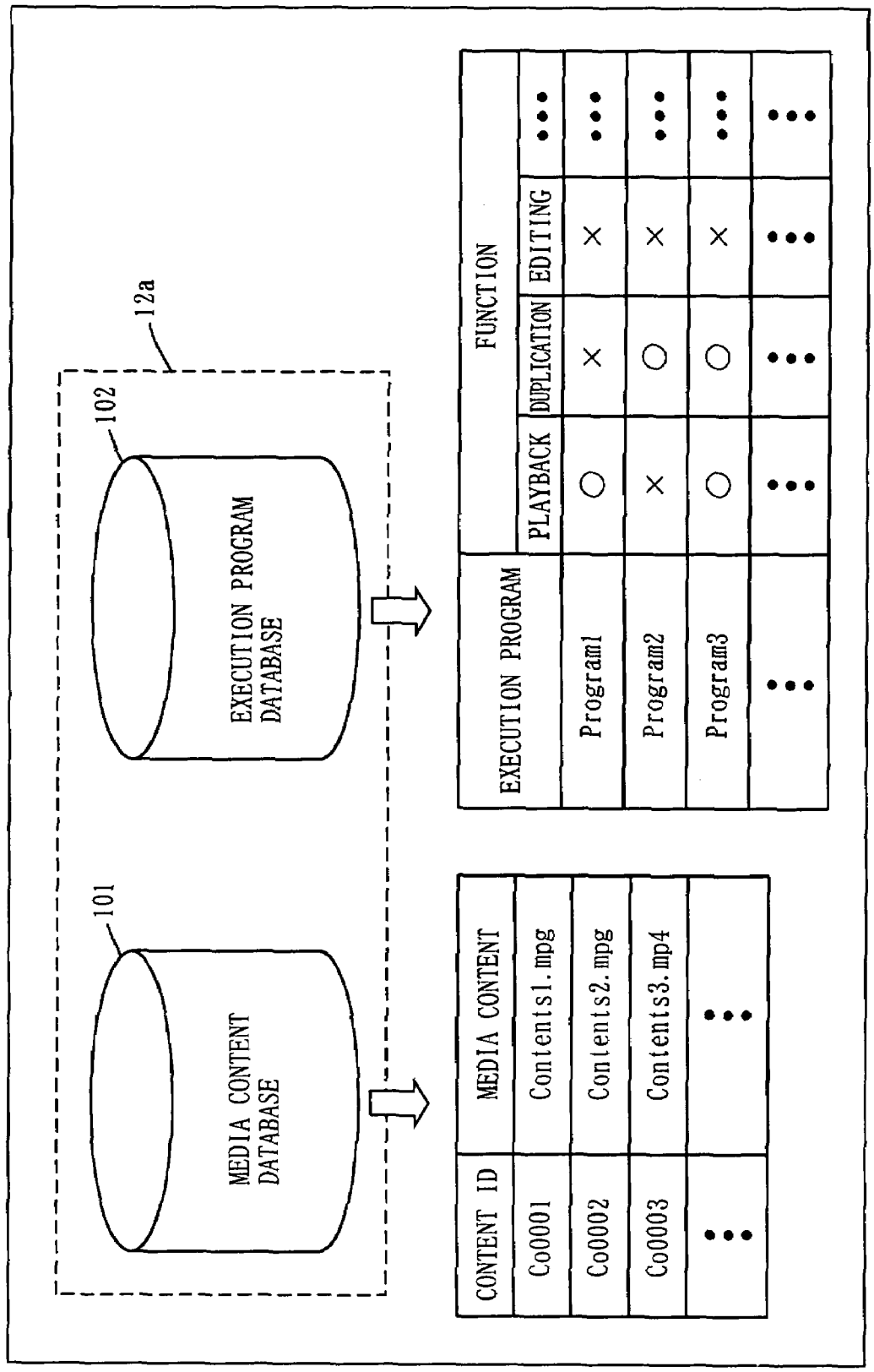
FIG. 4 is a diagram illustrating the details of a storage unit in the media contents distribution system according to the first, third and seventh embodiments of the present invention.

FIG. 4 is a diagram illustrating the details of the storage unit 12. FIG. 4 shows a storage unit 12a, which is a more detailed representation of the storage unit 12 shown in FIG. 1. The storage unit 12a internalizes a media content database 101 and an execution program database 102. The media content database 101 stores a plurality of media contents and identifiers ("content IDs") for the respective media contents. In the example illustrated in FIG. 4, three media contents are stored: "Contents1.mpg", "Contents2.mpg", and "Contents3.mp4". Identifiers "Co0001", "Co0002", and "Co0003" are respectively assigned to these three media contents.

The execution program database 102 stores a plurality of execution programs and functional information for the respective execution programs. In the example illustrated in FIG. 4, three execution programs are stored: "Program 1", "Program 2", and "Program 3". Program 1 has a media content playback function, but lacks a media content duplication function and a media content editing function. Program 2 has a media content duplication function, but lacks a media content playback function and a media content editing function. Program 3 has a media content playback function and a media content duplication function, but lacks a media content editing function. It will be appreciated that, other than the execution programs illustrated in FIG. 4, an execution program having a media content editing function but lacking a media content playback function and a media content duplication function, and/or an execution program having a media content playback function, a media content duplication function, and a media content editing function may be stored, for example.

Figures 5, 6:
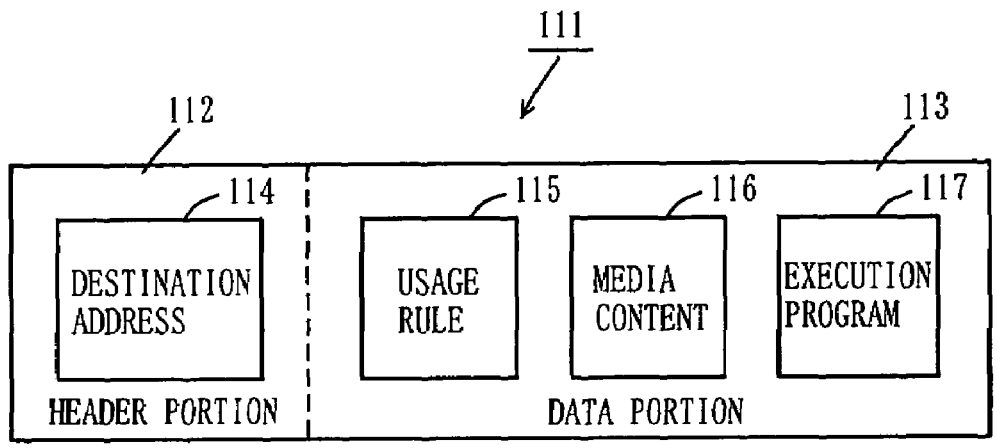
FIG. 5 is a diagram illustrating an exemplary structure of a capsule which is transmitted in a media contents distribution system according to the first embodiment of the present invention.
FIG. 6 shows an example of a usage rule which is employed in the media contents distribution system shown in FIG. 1.

FIG. 5 is a diagram illustrating an exemplary structure of a capsule which is transmitted from the server 1 to each terminal 2. As shown in FIG. 5, a capsule 111 includes a header portion 112 and a data portion 113. The header portion 112 stores a destination address 114 of the capsule 111. The data portion 113 stores a usage rule 115, a media content 116, and an execution program 117.

FIG. 6 shows an example of a usage rule. The usage rule shown in FIG. 6 is described using XML (Extensible Markup Language). The elements included in this usage rule have the following meanings. A Usage Rule element is a root element representing a usage rule of a media content. A usage rule is described in a portion interposed between a start tag <Usage Rule> and an end tag </UsageRule>. The content of each element is similarly described between a corresponding start tag <X> and a corresponding end tag </X> (where X is an arbitrary character string). A Contents ID element represents an identifier of the media content to which this usage rule applies. A User ID element represents an identifier of a user to whom this usage rule applies. A User Program ID element represents an identifier of an execution program to which this usage rule applies. However, the identifier described in a User Program ID element not only specifies an execution program but also specifies a user to which the execution program is distributed. Therefore, in the case where an execution program is distributed to a plurality of terminals, the instances of the execution program distributed to the respective terminals are given respectively different identifiers, so that they are regarded as different programs.

A Permission element describes a process which is permitted and conditions for performing that process. The Permission element has an attribute "action", which represents the process to be permitted. The content of a Permission element (i.e., the portion interposed between a start tag <Permission> and an end tag </Permission>) describes the conditions for performing the process. In the example illustrated in FIG. 6, the attribute "action" is Replay (playback), and the content of the Permission element describes conditions for performing a playback process as follows. A Section element represents a section in the media content that is permitted for processing, as defined by a From element indicating the beginning of the section and an Until element indicating the end of the section. If the Section element is absent, it is assumed that the entire media content is permitted for processing. On the other hand, a plurality of sections of a media content may be permitted for processing, in which case a plurality of Section elements will be present. A Times element represents a maximum number of times the processing for the media content is permitted. A Period element represents a period during which the processing for the media content is permitted, as defined by a From element indicating the beginning of the period and an Until element indicating the end of the period. The Permission element illustrated in FIG. 6 represents that the section spanning the first thirty minutes is permitted for playback up to three times at the maximum, during a period from Oct. 10, 2001 until Oct. 16, 2001.

The usage rule is distributed in an encrypted form in order to prevent tampering. A key for decrypting the usage rule may be, for example, previously notified from the administrator of the server 1 to the user of each terminal 2, and stored in the terminal 2. Alternatively, instead of previously notifying the key, the key may be provided simultaneously with the execution program (e.g., as embedded in the execution program). It will be appreciated that the usage rule shown in FIG. 6 is only one example. The descriptions may be rendered in methods other than XML, and other conditions may also be added.

Each terminal 2 stores a processing history for each media content, and determines the availability of the media content by using the processing history. The processing history for the media content is stored in the memory unit 24. The control unit 22 updates the processing history stored in the memory unit 24 each time a process is performed for the relevant media content.

FIG. 7 shows an example of the processing history. The processing history illustrated in FIG. 7 is described using XML, as is the case with the usage rule illustrated in FIG. 6. The elements included in this processing history have the following meanings. A History element is a root element which represents a processing history for a media content. A Contents ID element represents an identifier of the media content which has been processed by a process described in this processing history. A User Program ID element represents an identifier of an execution program which has performed a process described in this processing history. An Access Log element describes a history of applying the process described in an attribute "action", as indicated by a Times element (which represents a number of times of processing) and an Access Date element (which represents a date of processing). The Access Log element illustrated in FIG. 7 represents that a playback has been performed once at 20:30, Oct. 11, 2001, Japan standard time.

The processing history is stored in an encrypted form in order to prevent tampering. Keys for encrypting and decrypting the processing history are embedded in an execution program. For example, if the usage rule illustrated in FIG. 6 and the processing history illustrated in FIG. 7 are stored in the memory unit 24 as of Oct. 12, 2001, the control unit 22 first confirms that today falls within the period from Oct. 10, 2001 until Oct. 16, 2001 and that the number of times of playback is one, which is less than the allowable number of times of use (i.e., three in this example), and then permits the section spanning the first thirty minutes of the media content to be played back.

Figure 8:
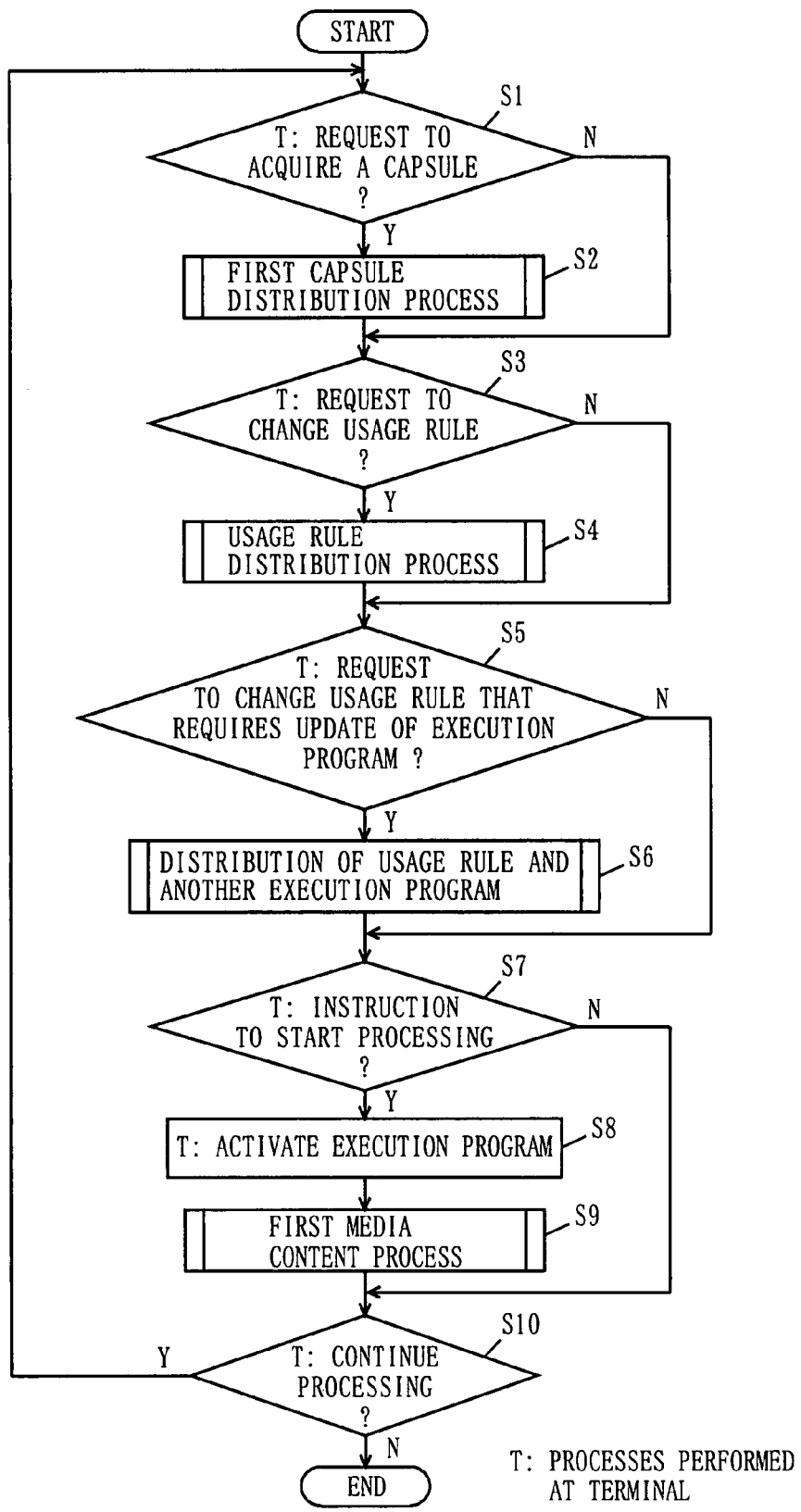
FIG. 8 is a main flowchart illustrating the operation of the media contents distribution system according to the first embodiment of the present invention.

FIG. 8 is a main flowchart illustrating the operation of the media contents distribution system according to the present embodiment. In any of the following flowcharts, any step whose caption begins with a label "S:" is a process to be performed by the server 1, and any step whose caption begins with a label "T:" is a process to be performed by a terminal 2. In FIG. 8, the control unit 22 first determines whether or not a request to acquire a capsule has been inputted to the input/output unit 21 (step S1), and proceeds to step S3 if the result of the determination is "NO". If the result of the determination at step S1 is "YES", a first capsule distribution process (FIG. 9) is performed, through which a requested capsule is distributed from the server 1 to the terminal 2 (step S2).

At step S3, the control unit 22 determines whether or not a request to change the usage rule has been inputted to the input/output unit 21, and proceeds to step S5 if the result of the determination is "NO". If the result of the determination at step S3 is "YES", a usage rule distribution process (FIG. 10) is performed, through which a new usage rule is distributed from the server 1 to the terminal 2 (step S4).

At step S5, the control unit 22 determines whether or not any request to change the usage rule that requires an update of the execution program has been inputted to the input/output unit 21, and proceeds to step S7 if the result of the determination is "NO". If the result of the determination at step S5 is "YES", a distribution process of a usage rule and another execution program (FIG. 11) is performed, through which a new usage rule and another execution program are distributed from the server 1 to the terminal 2 (step S6).

At step S7, the control unit 22 determines whether or not an instruction to start processing has been given via the input/output unit 21, and proceeds to step S10 if the result of the determination is "NO". If the result of the determination at step S7 is "YES", the control unit 22 activates the execution program stored in the memory unit 24 (step S8), and executes a first media content process (FIG. 12) in accordance with the activated execution program (step S9).

At step S10, the control unit 22 determines whether or not to continue processing, and if the result of the determination is "YES", returns to step S1. In this case, the process from steps S1 to S9 is again performed. If the result of the determination of step S10 is "NO", the control unit 22 stops processing.

Figure 9:
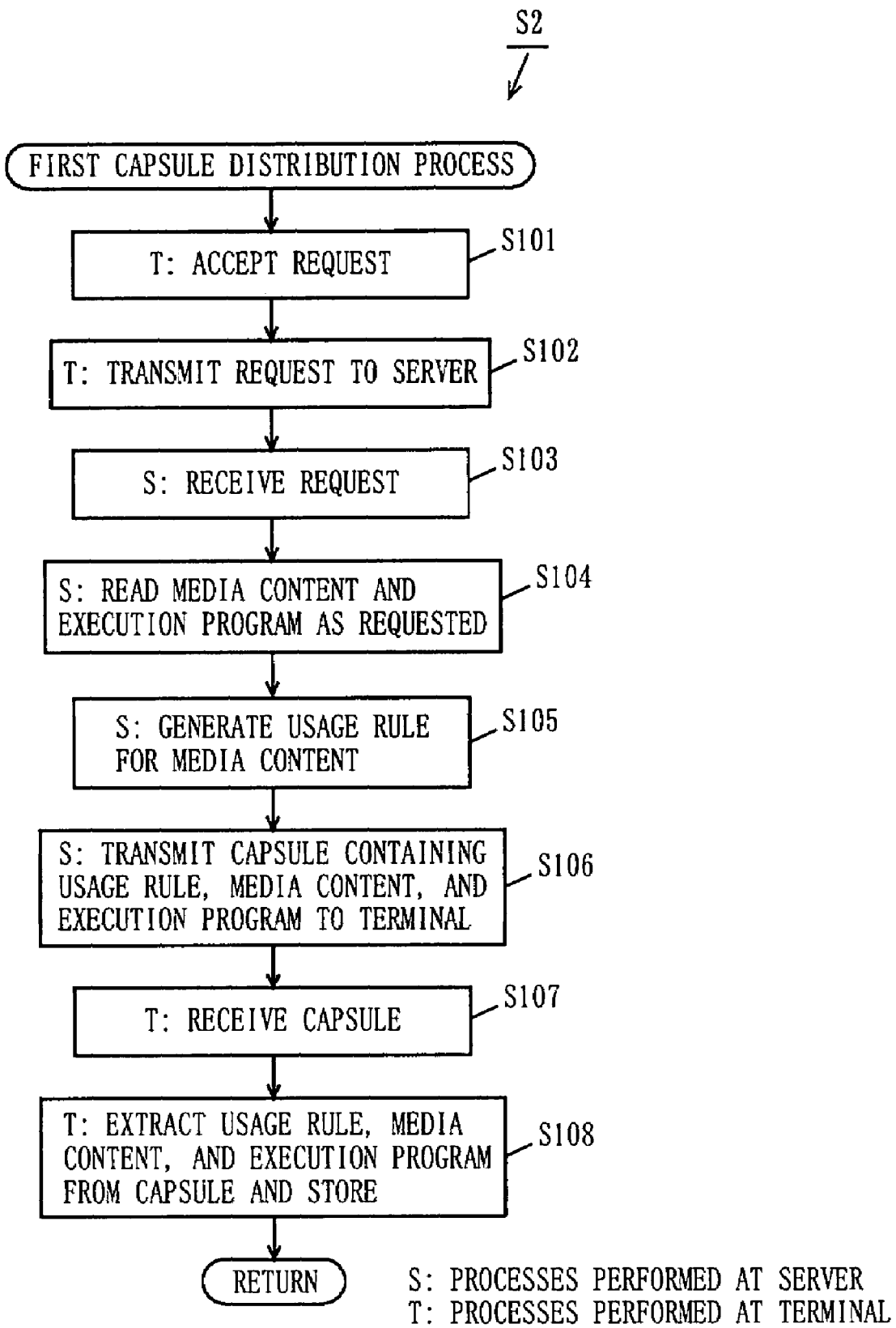
FIG. 9 is a flowchart illustrating the details of step S2 in FIG. 8.

FIG. 9 is a flowchart illustrating the details of step S2. If step S1 of FIG. 8 determines that a request has been inputted, the control unit 22 accepts the inputted request (step S101). At step S101, a request to play back the section spanning the first thirty minutes of a media content "Contents1.mpg" three times may be inputted, for example. Next, by means of the communication unit 23, the control unit 22 transmits the request accepted at step S101 to the server 1 via the network 3 (step S102).

By means of the communication unit 13, the control unit 11 of the server 1 receives the request which has been transmitted from the terminal 2 (step S103). Next, the control unit 11 reads a media content and an execution program from the media content database 101 and the execution program database 102, respectively, that correspond to the received request (step S104), and generates a usage rule for the media content (step S105). At step S105, a usage rule illustrated in FIG. 6 may be generated, for example. Then, the control unit 11 encapsulates the media content and the execution program read at step S104 and the usage rule generated at step S105 into a capsule 111 as shown in FIG. 5, and transmits the capsule 111 to the terminal 2 by means of the communication unit 13 (step S106).

The control unit 22 of the terminal 2 receives the capsule 111 which has been transmitted from the server 1 by means of the communication unit 23 (step S107). Then, the control unit 22 extracts the usage rule 115, the media content 116, and the execution program 117 from the received capsule 111, and stores them in the memory unit 24 (step S108). After the first capsule distribution process is thus completed, step S3 of FIG. 8 is performed.

Figure 10:
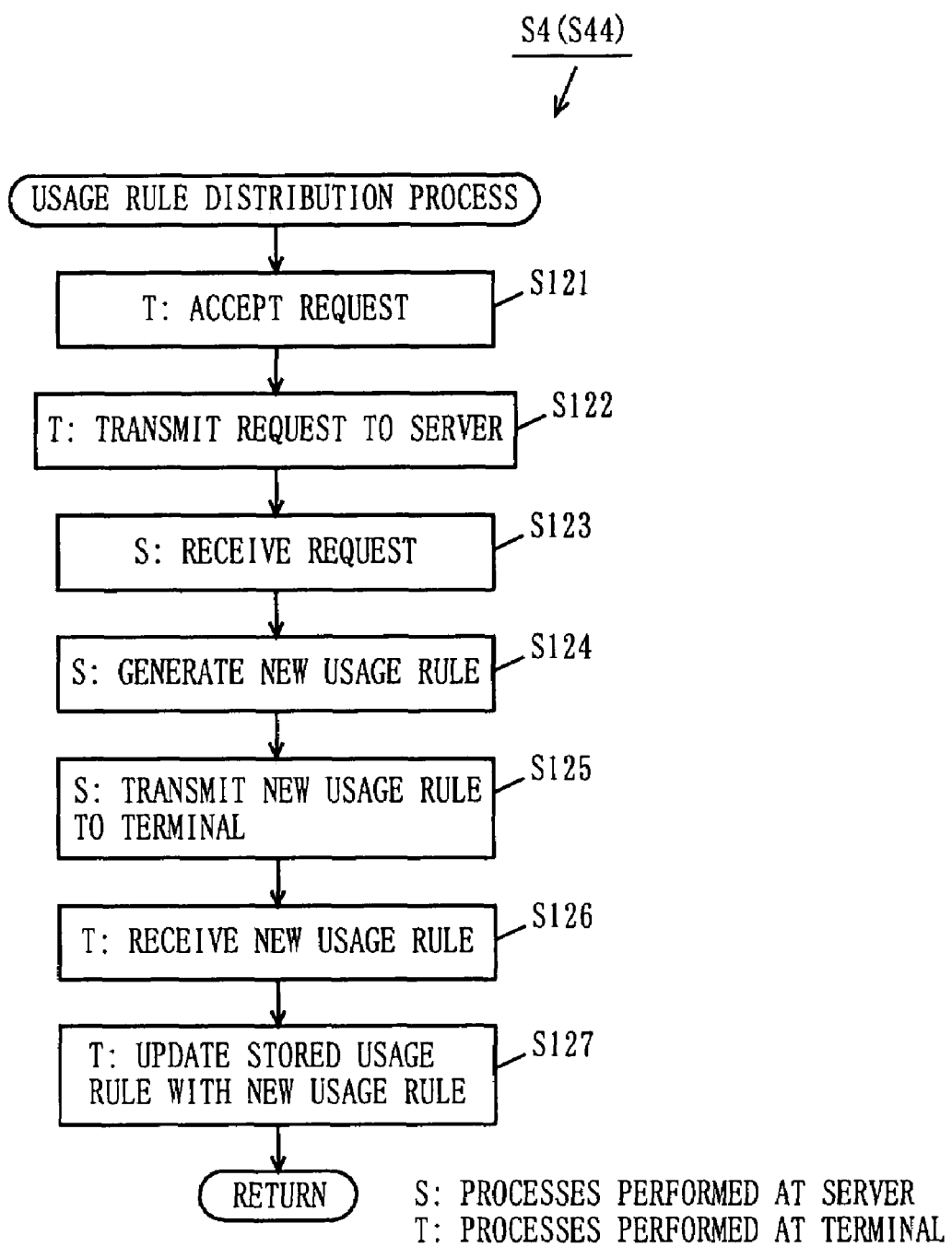
FIG. 10 is a flowchart illustrating the details of step S4 in FIG. 8.

FIG. 10 is a flowchart illustrating the details of step S4. If step S3 of FIG. 8 determines that a request has been inputted, the control unit 22 accepts the inputted request (step S121). At step S121, a request to change the usage rule "the section spanning the first thirty minutes may be played back up to three times" for the media content "Contents1.mpg" so that this section is allowed to be played back two more times (i.e., totaling five times) may be inputted. Next, by means of the communication unit 23, the control unit 22 transmits the request accepted at step S121 to the server 1, via the network 3 (step S122).

By means of the communication unit 13, the control unit 11 of the server 1 receives the request which has been transmitted from the terminal 2 (step S123). Next, the control unit 11 generates a new usage rule corresponding to the received request (step S124). At step S124, a new usage rule stating that "the section spanning the first thirty minutes may be played back up to five times" is generated for the media content "Contents1.mpg", for example. Next, the control unit 11 transmits the usage rule newly generated at step S124 to the terminal 2 by means of the communication unit 13 (step S125).

By means of the communication unit 23, the control unit 22 of the terminal 2 receives the new usage rule which has been transmitted from the server 1 (step S126). Next, the control unit 22 overwrites the new usage rule received at step S126 so as to replace the usage rule stored in the memory unit 24 (step S127). After thus updating the usage rule, step S5 of FIG. 8 is performed.

Figure 11:
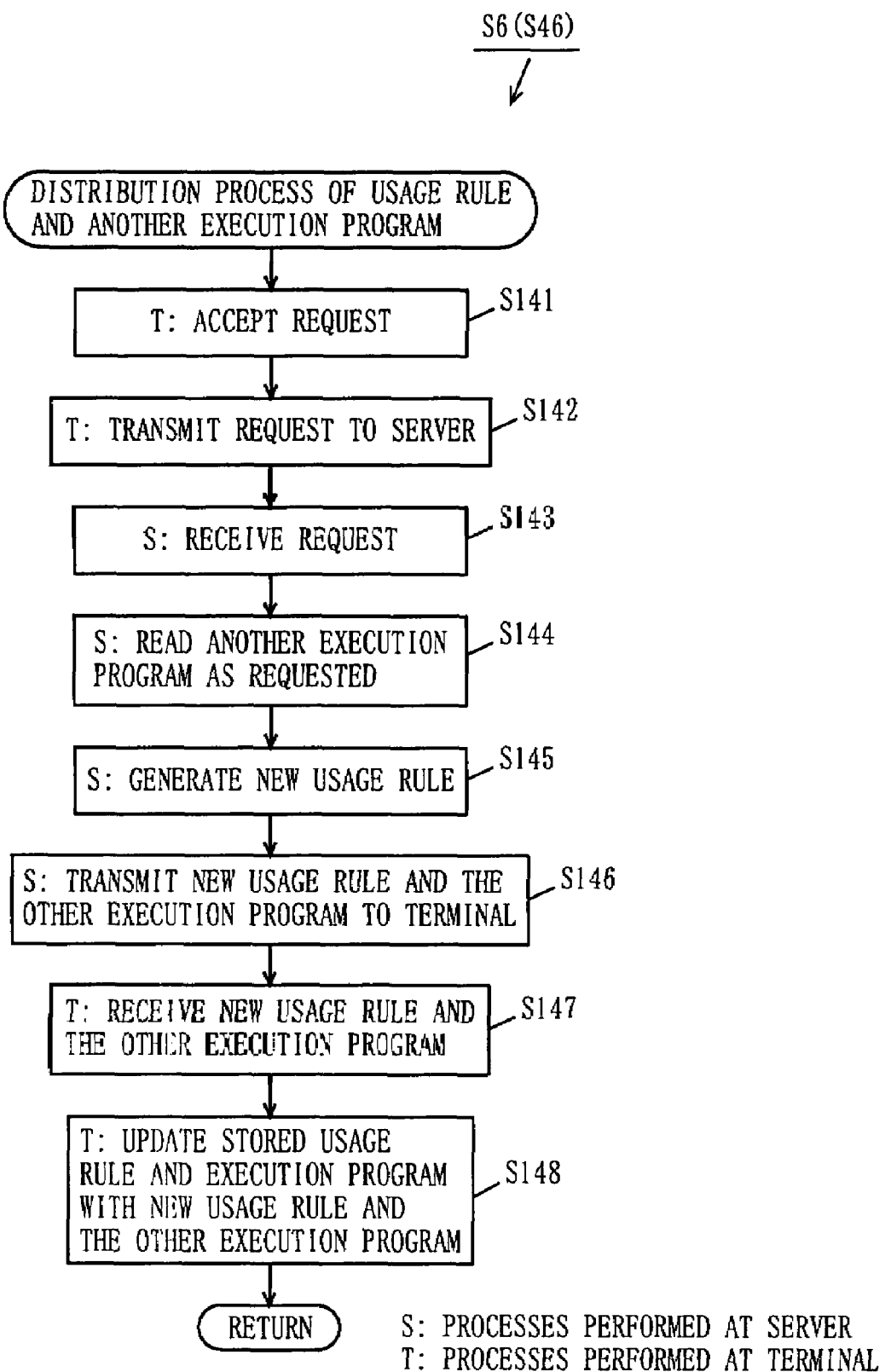
FIG. 11 is a flowchart illustrating the details of step S6 in FIG. 8.

FIG. 11 is a flowchart illustrating the details of step S6. If step S5 of FIG. 8 determines that a request has been inputted, the control unit 22 accepts the inputted request (step S141). At step S141, a request to change the usage rule "section spanning the first thirty minutes may be played back up to three times" for the media content "Contents1.mpg" so that this section is allowed to be duplicated once may be inputted, for example. Then, by means of the communication unit 23, the control unit 22 transmits the request accepted at step S141 to the server 1 via the network 3 (step S142).

By means of the communication unit 13, the control unit 11 of the server 1 receives the request which has been transmitted from the terminal 2 (step S143). Next, the control unit 11 reads another execution program (e.g., an editing program) corresponding to the received request from the execution program database 102 (step S144), and generates a new usage rule (step S145). At step S145, a new usage rule stating that "the section spanning the first thirty minutes may be duplicated only once" is generated for the media content "Contents1.mpg", for example. Next, the control unit 11 transmits the other execution program which has been read at step S144 and the new usage rule which has been generated at step S145 to the terminal 2 by means of the communication unit 13 (step S146).

By means of the communication unit 23, the control unit 22 of the terminal 2 receives the new usage rule and the other execution program transmitted from the server 1 (step S147). Next, the control unit 22 overwrites the new usage rule and the other execution program received at step S147 so as to replace the usage rule and the execution program, respectively, stored in the memory unit 24 (step S148). After thus updating the usage rule and the execution program, step S7 of FIG. 8 is performed.

Figure 12:
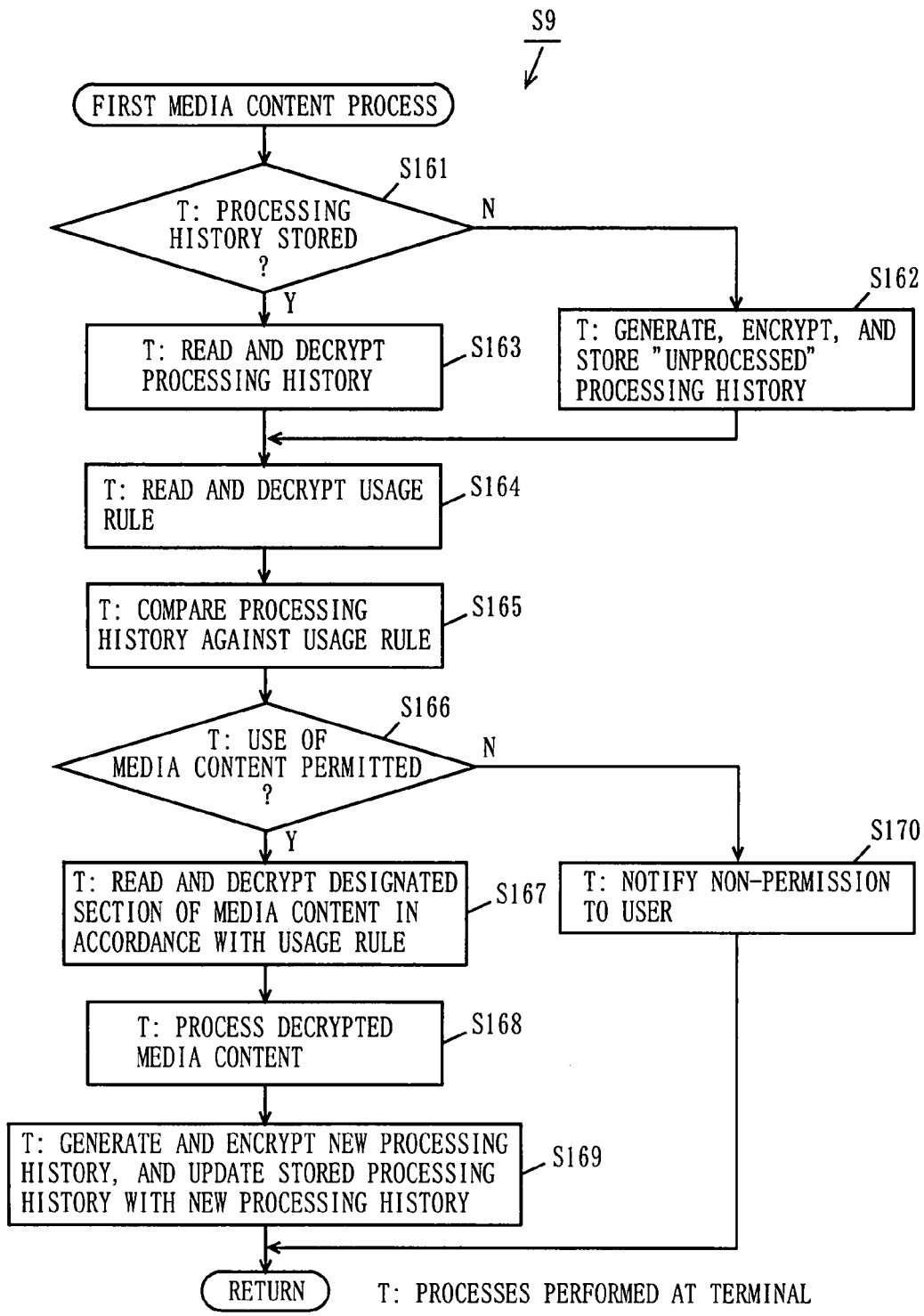
FIG. 12 is a flowchart illustrating the details of step S9 in FIG. 8.

FIG. 12 is a flowchart illustrating the details of step S9. After activating the execution program at step S8 of FIG. 8, the control unit 22 checks whether or not a processing history for the media content to be processed is stored in the memory unit 24 (step S161). If no such processing history is stored, the control unit 22 generates a processing history representing "unprocessed" and stores the generated processing history in an encrypted form to the memory unit 24 (step S162). If a relevant processing history is stored, the control unit 22 reads the processing history from the memory unit 24 and decrypts the processing history (step S163).

Next, the control unit 22 reads the usage rule from the memory unit 24 and decrypts the usage rule (step S164). Then, the control unit 22 compares the processing history which has been read at step S163 (or generated at step S162) against the usage rule which has been read at step S164 (step S165), and determines whether or not the use of the media content is permitted (step S166).

If the use of the media content is permitted, the control unit 22 instructs the processing unit 25 to read the designated section of the media content from the memory unit 24 and decrypt the media content which has been read, in accordance with the usage rule (step S167). Next, the control unit 22 instructs the processing unit 25 to process the decrypted media content (step S168). At steps S167 and S168, the section spanning the first thirty minutes of the media content is read from the memory unit 24 and decrypted, and thereafter played back, for example. Then, the control unit 22 generates a new processing history and encrypts the new processing history, and overwrites the new processing history so as to replace the processing history stored in the memory unit 24 (step S169).

If step S166 finds that the use of the media content is not permitted, the control unit 22 notifies this to the user via the input/output unit 21 (step S170). After the first media content process is thus completed, step S10 of FIG. 8 is performed.

In accordance with the above-described configuration, in order to determine the availability of a media content, the terminal 2 stores a processing history, and compares the stored processing history against a usage rule. Alternatively, the description of the usage rule may be updated instead of storing a processing history. For example, if the usage rule states that a media content "may be played back up to three times" in accordance with the above-described configuration, the terminal 2 will retain a received usage rule as it is, and a number of accesses having been made which is described as part of the processing history will be updated from 0 times→one time→two times every time a playback is performed, until playback becomes prohibited as the number of accesses having been made reaches three. Alternatively, the terminal 2 may update the allowable number of times of use which is described as part of the usage rule from three times→two times→one time, until playback becomes prohibited as the allowable number of times of use reaches zero.

In accordance with the above-described configuration, the server 1 encapsulates a usage rule, a media content, and an execution program into one capsule, which is distributed to a terminal 2. Alternatively, these three data may be separately distributed. Alternatively, any two of these three data may be encapsulated into a capsule to be distributed, and the other data may be separately distributed. Alternatively, the server 1 may distribute a usage rule in a form that is embedded within a media content or an execution program.

In the case where a usage rule is provided to a terminal 2 through a route which is external to the system, the server 1 only needs to distribute a media content and an execution program. In the case where a usage rule and a media content are provided to the terminal 2 through a route which is external to the system, the server 1 only needs to distribute an execution program. Methods for providing a usage rule and/or a media content to a terminal 2 through a route which is external to the system may include, for example, providing these data as stored in a removable recording medium such as a CD-ROM, or a DVD, or providing these data from an external server (not shown) which is connected to the network 3.

In accordance with the above-described configuration, an execution program is overwritten upon request from a user.

Alternatively, the execution program may be overwritten at any other time (e.g., when the execution program is upgraded in version).

As described above, in the media contents distribution system according to the present embodiment, the server 1 stores media contents and execution programs, and the server 1 distributes a media content and an execution program to a terminal 2. The terminal 2 executes the distributed execution program to process the distributed media content. A usage rule is set for the media content which is distributed from the server 1, and the terminal 2 processes the distributed media content within the bounds of this usage rule. As a result, it is possible to apply certain limitations to the use of the distributed media content. For example, only a number of terminals may be allowed to use the media content; the media content may only be allowed to be played back, while prohibiting duplication or editing thereof; the media content may be limited in terms of its allowable number of times of use, allowable total time of use, and/or allowable period of use; and/or only a section of the media content may be made available. Thus, it is possible to limit the use of media contents in various manners.

Moreover, in the media contents distribution system according to the present embodiment, after a capsule containing a media content, an execution program, and a usage rule is distributed, a new usage rule may be further distributed as necessary, thereby changing the usage rule stored in the terminal 2 at an arbitrary point in time. For example, if a capsule containing a media content, a media content playback program, and a usage rule stating that "the media content may be played back up to three times" is received, the terminal 2 can no longer process the media content after it has been played back three times. In this case, the user of the terminal 2 may request to "play back the media content two more times", in which case the terminal 2 transmits the user's request to the server 1. In response to this request, the server 1 may distribute a new usage rule stating that "the media content may be played back up to five times" to the terminal 2. Upon receiving this new usage rule, the terminal 2 overwrites the new usage rule stating that "the media content may be played back up to five times" to replace the usage rule stating that "the media content may be played back up to three times", which has been stored in the memory unit 24. Since the processing history stored in the memory unit 24 indicates that the media content "has been played back three times", the terminal 2 is now allowed to play back the media content two more times.

Moreover, in the media contents distribution system according to the present embodiment, after a capsule containing a media content, an execution program, and a usage rule is distributed, another execution program and a new usage rule may be further distributed as necessary, thereby being able to overwrite the other execution program and the new usage rule so as to replace the execution program and the usage rule, respectively, which are stored in the terminal 2. For example, consider a case where, in the above-illustrated example, the media content has been played back three times and thereafter the user requests to "duplicate the media content". In this case, the terminal 2 transmits the user's request to the server 1, in response to which the server 1 may distribute a media content duplication program and a new usage rule stating that "the media content may be duplicated once" to the terminal 2. Upon receiving the media content duplication program and the new usage rule, the terminal 2 overwrites the media content duplication program so as to replace the media content playback program stored in the memory unit 24, and overwrites the new usage rule stating that "the media content may be duplicated once" so as to replace the usage rule stating that "the media content may be played back up to three times". Since the processing history stored in the memory unit 24 indicates that the media content "has been played back three times" (that is, no history concerning duplication exists so far), the terminal 2 is now allowed to duplicate the media content once. Once a duplication is performed, the processing history is rewritten so as to state that the media content "has been played back three times and duplicated once", after which duplication of the media content will be prohibited.

According to the first embodiment, media contents, execution programs, and usage rules are distributed from the server 1 to the terminals 2, and thereafter are kept under management at the terminals 2. In order to prevent unauthorized duplication of the media contents or tampering of the usage rules at the terminals 2, the media contents and the usage rules are distributed in an encrypted form. In view of the possibility that decryption keys or the like to the media contents and the usage rules may be somehow leaked, it is also possible to keep the media contents and/or usage rules under management at the server 1, as illustrated in second to fourth embodiments below.

The second embodiment adopts a method in which a media content and an execution program are distributed to a terminal 2, whereas a usage rule is kept under management at the server 1. The third embodiment adopts a method in which an execution program and a usage rule are distributed to a terminal 2, whereas a media content is kept under management at the server 1. The fourth embodiment adopts a method in which an execution program is distributed to a terminal 2, whereas a media content and a usage rule are kept under management at the server 1. Thus, by keeping a usage rule and/or a media content under management at the server 1, it becomes possible to prevent unauthorized duplication of the media contents or tampering of the usage rules at the terminals 2.

Second Embodiment

According to the second embodiment of the present invention, a media content and an execution program are distributed to a terminal, whereas a usage rule is kept under management at the server. Thus, the second embodiment differs from the first embodiment, which provides that a media content, an execution program, and a usage rule are distributed to a terminal. Hereinafter, the differences between the first embodiment and the second embodiment will be described in detail.

Figure 13:
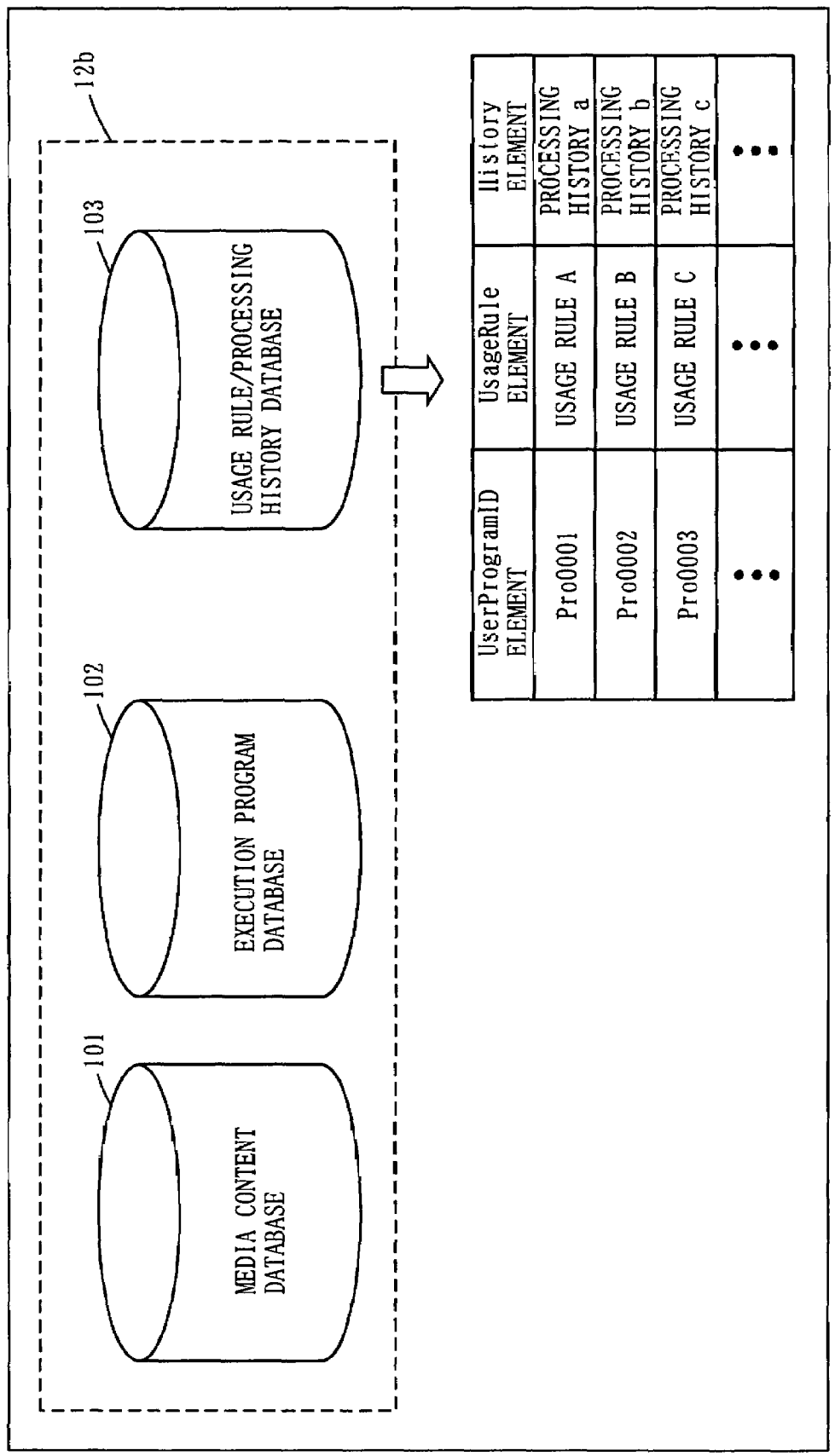
FIG. 13 is a diagram illustrating the details of a storage unit in the media contents distribution system according to the second and fourth embodiments of the present invention.

As in the case of the first embodiment, the media contents distribution system according to the present embodiment has a configuration as illustrated in FIGS. 1 to 3. FIG. 13 is a diagram illustrating the details of the storage unit 12 according to the present embodiment. FIG. 13 shows a storage unit 12*b*, which is a more detailed representation of the storage unit 12 shown in FIG. 1. The storage unit 12*b* internalizes a media content database 101, an execution program database 102, and a usage rule/processing history database 103. Since the details of the media content database 101 and the execution program database 102 are similar to those in the first embodiment (see FIG. 4), the descriptions thereof are omitted from FIG. 13.

The usage rule/processing history database 103 stores User Program ID elements, UsageRule elements, and History elements with respect to execution programs which have previously been distributed to the terminals 2. Each User Program ID element represents an identifier of an execution program. However, as in the case of the first embodiment, the identifier described in a User Program ID element not only specifies an execution program but also specifies a user to which the execution program has been distributed. Each UsageRule element and each History element are identical to those stored in the memory unit 24 according to the first embodiment. For example, each UsageRule element and each History element may have data structures shown in FIG. 6 and FIG. 7, respectively.

Figure 14:
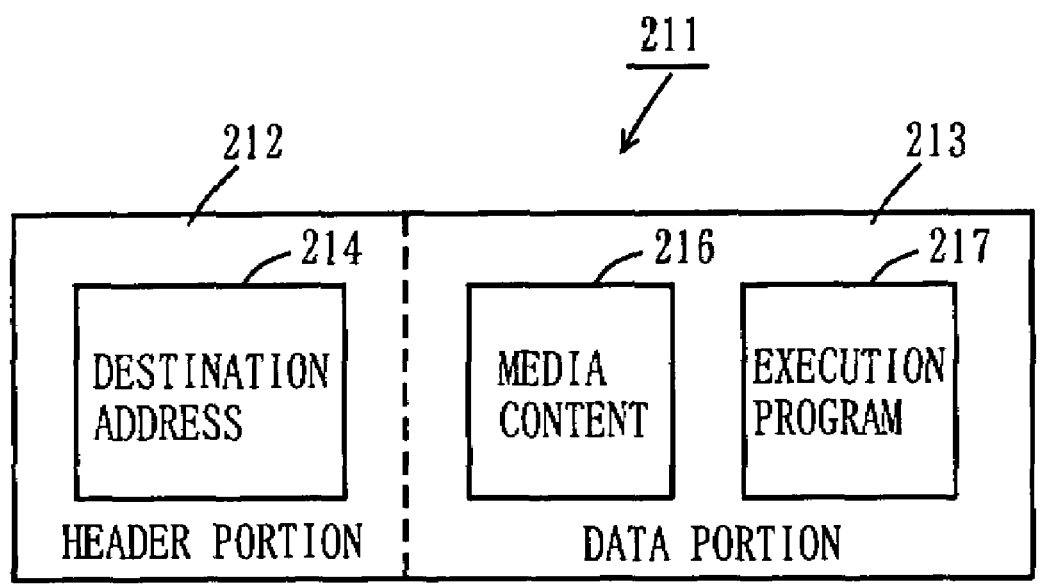
FIG. 14 is a diagram illustrating an exemplary structure of a capsule which is transmitted in a media contents distribution system according to the second embodiment of the present invention.

FIG. 14 is a diagram illustrating an exemplary structure of a capsule which is transmitted from the server 1 to each terminal 2. As shown in FIG. 14, a capsule 211 includes a header portion 212 and a data portion 213. The header portion 212 stores a destination address 214 of the capsule 211. The data portion 213 stores a media content 216 and an execution program 217.

In the above-described first embodiment, a usage rule is distributed to the terminal 2 so as to be stored in its memory unit 24, and a processing history for a media content is generated by a terminal 2 and stored in its memory unit 24. In contrast, according to the present embodiment, a usage rule is stored in the storage unit 12, rather than being distributed to a terminal 2. A processing history for a media content is generated by the server 1, and stored in the storage unit 12. Therefore, when the terminal 2 has processed a media content, the terminal 2 notifies the details of the processing to the server 1, and, based on the notification from the terminal 2, the server 1 rewrites the processing history stored in the storage unit 12.

Figure 15:
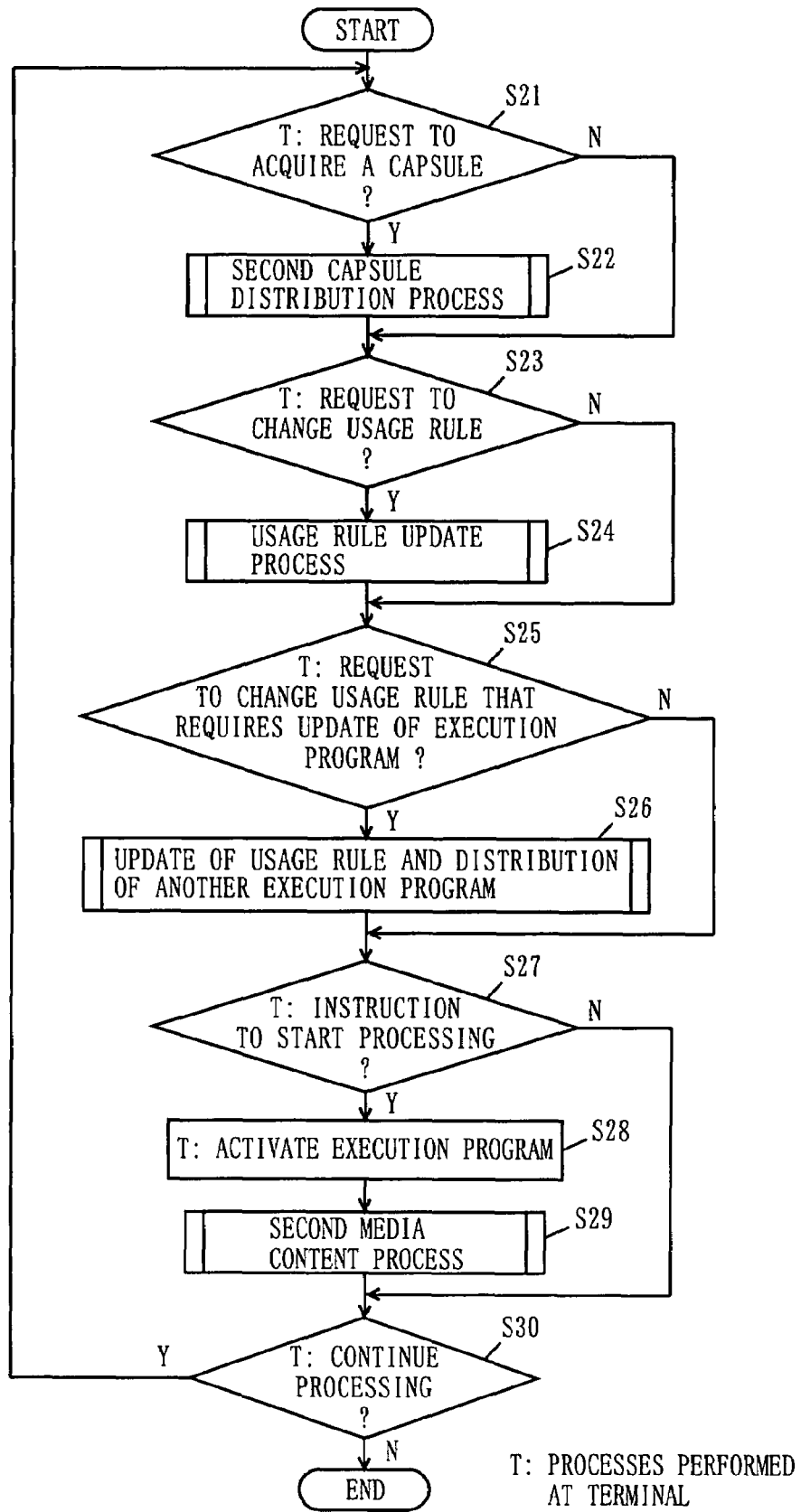
FIG. 15 is a main flowchart illustrating the operation of a media contents distribution system according to the second embodiment of the present invention.

FIG. 15 is a main flowchart illustrating the operation of the media contents distribution system according to the present embodiment. The flowchart shown in FIG. 15 is identical to the flowchart shown in FIG. 8 except for steps S22, S24, S26, and S29. Hereinafter, the details of steps S22, S24, S26, and S29 will be described.

Figure 16:
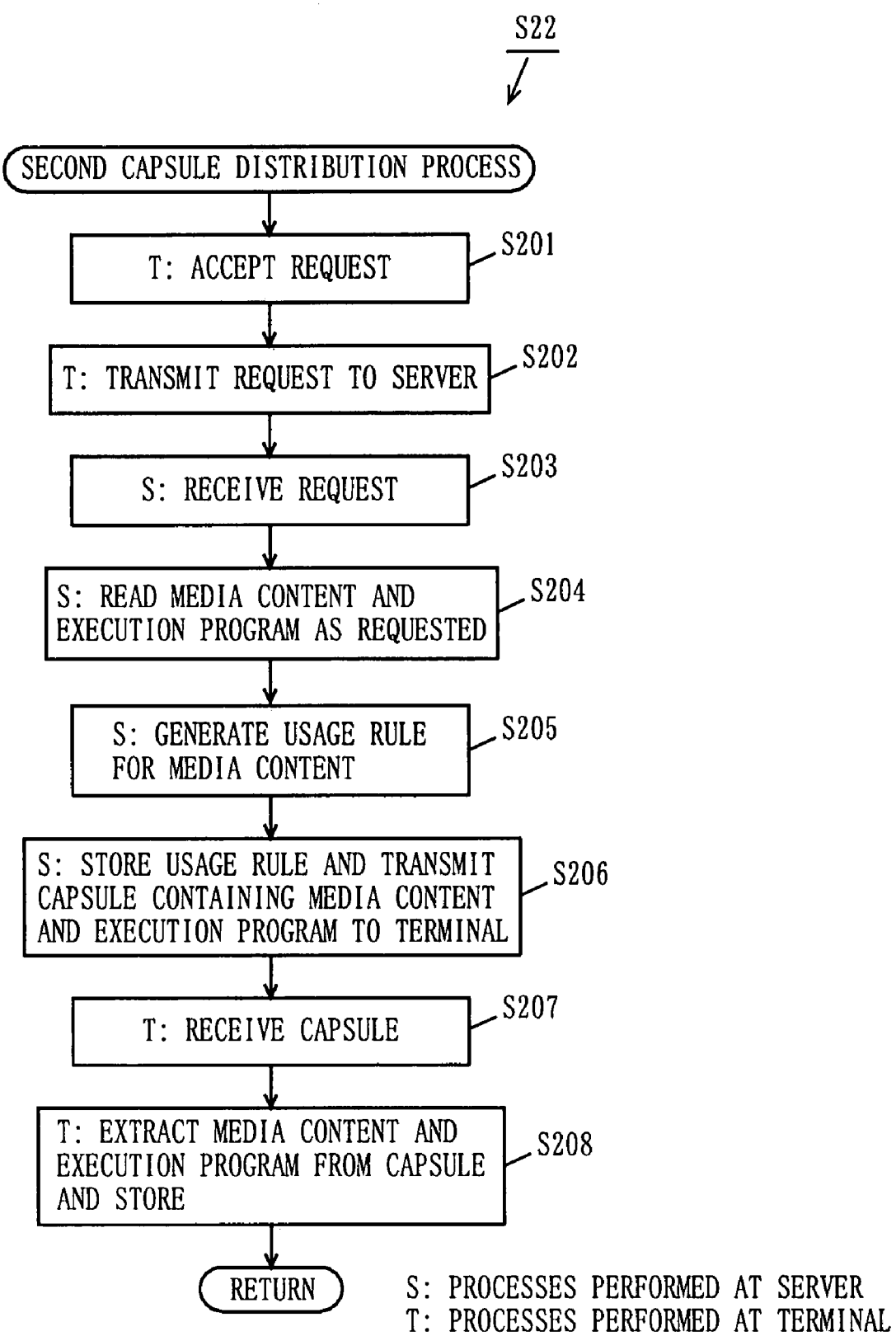
FIG. 16 is a flowchart illustrating the details of step S22 in FIG. 15.

FIG. 16 is a flowchart illustrating the details of step S22. When a request is inputted at step S21 of FIG. 15, steps S201 to S205 are performed. Steps S201 to S205 are identical to steps S101 to S105 of FIG. 9, except that usage rules are not encrypted because the usage rules will never be tampered with at the terminals 2 according to the present embodiment.

Next, the control unit 11 encapsulates a media content and an execution program which have been read at step S204 into a capsule 211 as shown in FIG. 14, and transmits the capsule 112 to a terminal 2 by means of the communication unit 13. Moreover, the control unit 11 stores a usage rule generated at step S205 in the usage rule/processing history database 103 (step S206).

By means of the communication unit 23, the control unit 22 of the terminal 2 receives the capsule 211 transmitted from the server 1 (step S207). Then, the control unit 22 extracts the media content 216 and the execution program 217 from the received capsule 211, and stores them in the memory unit 24 (step S208). After the second capsule distribution process is thus completed, step S23 of FIG. 15 is performed.

Figure 17:
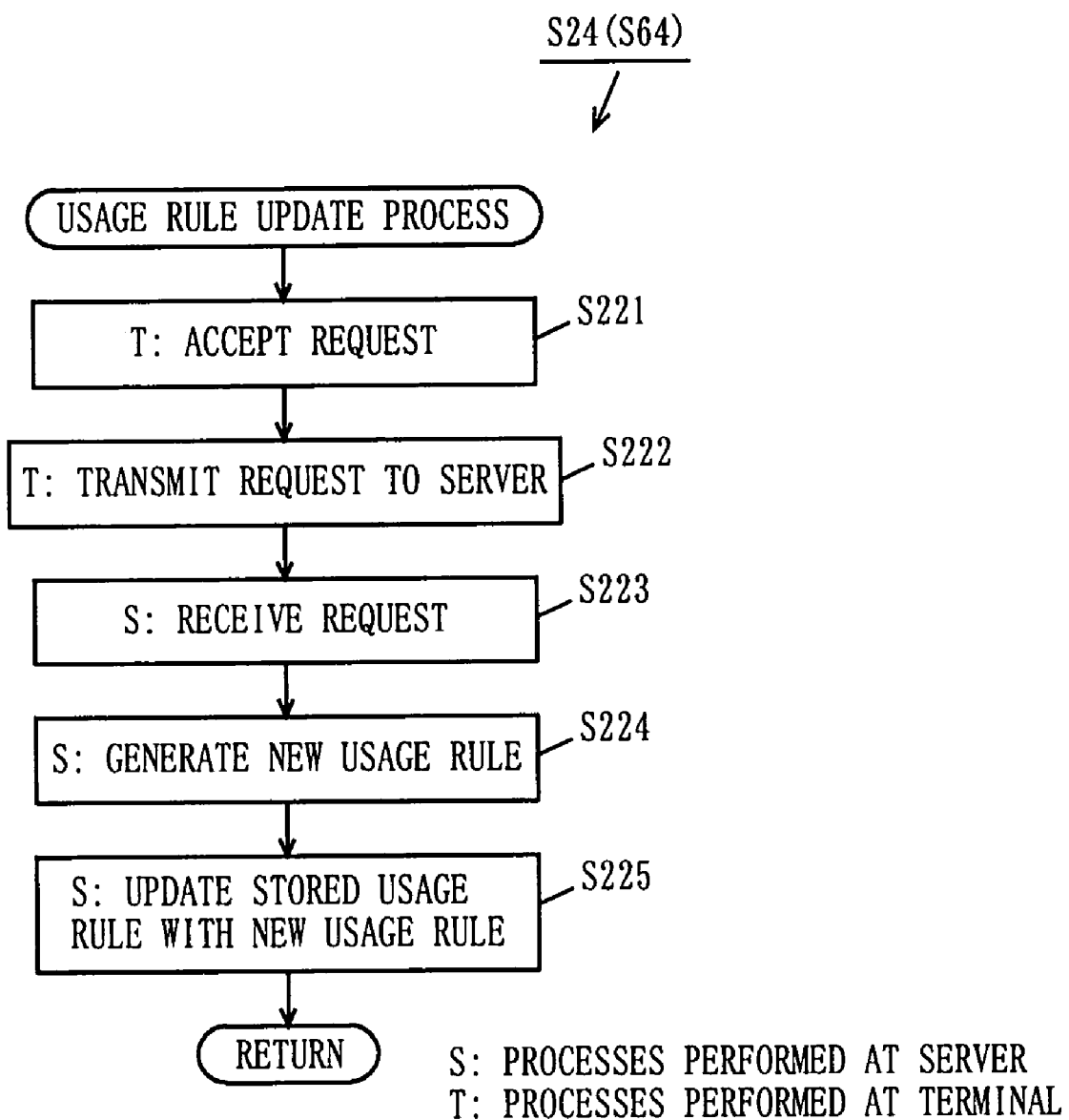
FIG. 17 is a flowchart illustrating the details of step S24 in FIG. 15.

FIG. 17 is a flowchart illustrating the details of step S24. If a request is inputted at step S23 of FIG. 15, steps S221 to S224 are performed. Steps S221 to S224 are identical to steps S121 to S124 of FIG. 10, except that usage rules are not encrypted because the usage rules will never be tampered at the terminals 2 according to the present embodiment.

Next, the control unit 11 overwrites a new usage rule generated at step S224 so as to replace the usage rule stored in the usage rule/processing history database 103 (step S225). After thus completing the usage rule overwriting process, step S25 of FIG. 15 is performed.

Figure 18:
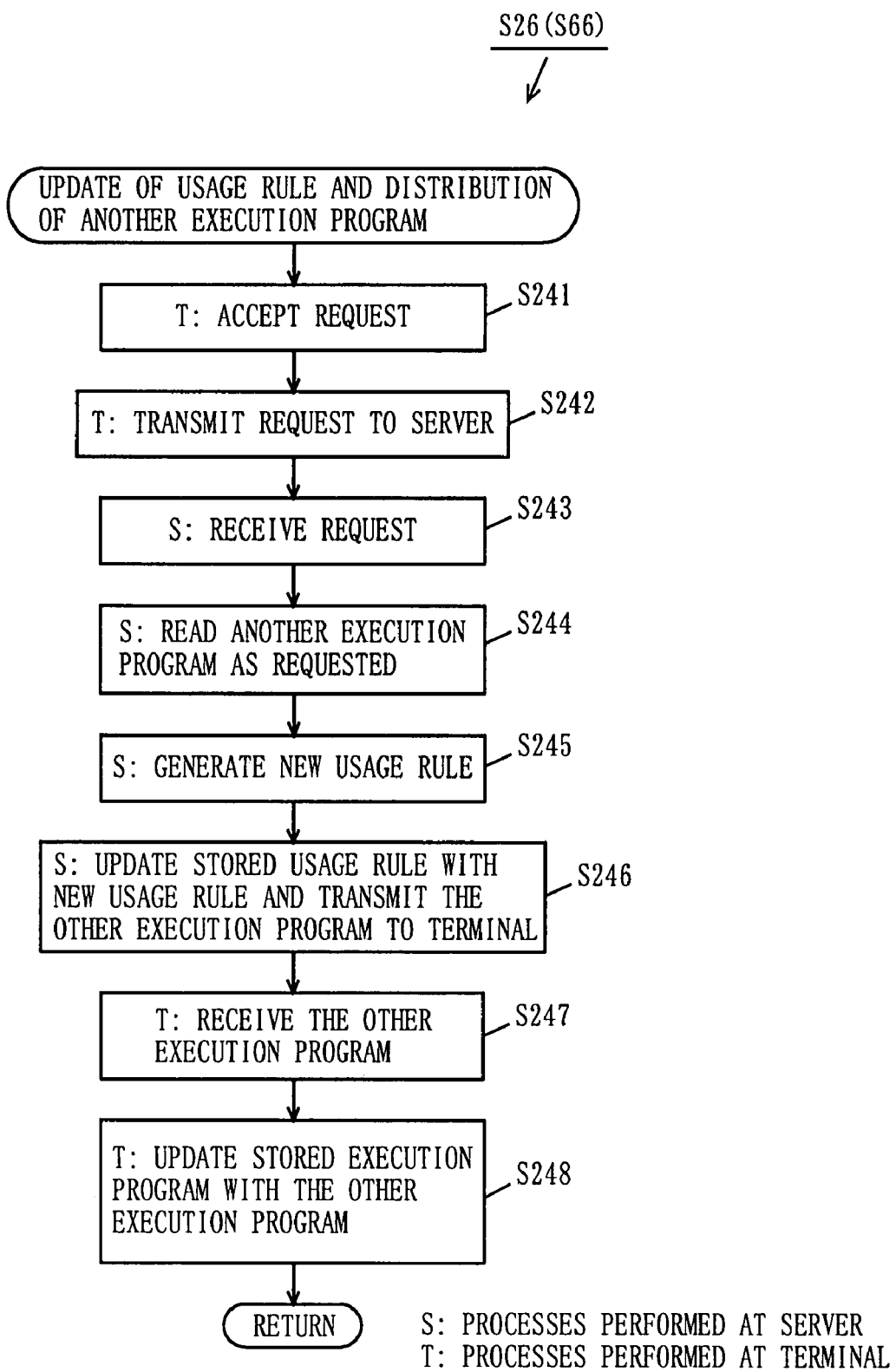
FIG. 18 is a flowchart illustrating the details of step S26 in FIG. 15.

FIG. 18 is a flowchart illustrating the details of step S26. If a request is inputted at step S25 of FIG. 15, steps S241 to S245 are performed. Steps S241 to S245 are identical to steps S141 to S145 of FIG. 11, except that usage rules are not encrypted because the usage rules will never be tampered with at the terminals 2 according to the present embodiment.

Next, the control unit 11 transmits another execution program which has been read at step S244 to the terminal 2 by means of the communication unit 13, and overwrites the new usage rule generated at step S245 so as to replace the usage rule stored in the storage unit 12 (step S246).

By means of the communication unit 23, the control unit 22 of the terminal 2 receives the other execution program which has been transmitted from the server 1 (step S247). Next, the control unit 22 overwrites the other execution program received at step S247 so as to replace the execution program stored in the memory unit 24 (step S248). After thus completing an update of the usage rule at the server 1 and an update of the execution program at the terminal 2, step S27 of FIG. 15 is performed.

Figure 19:
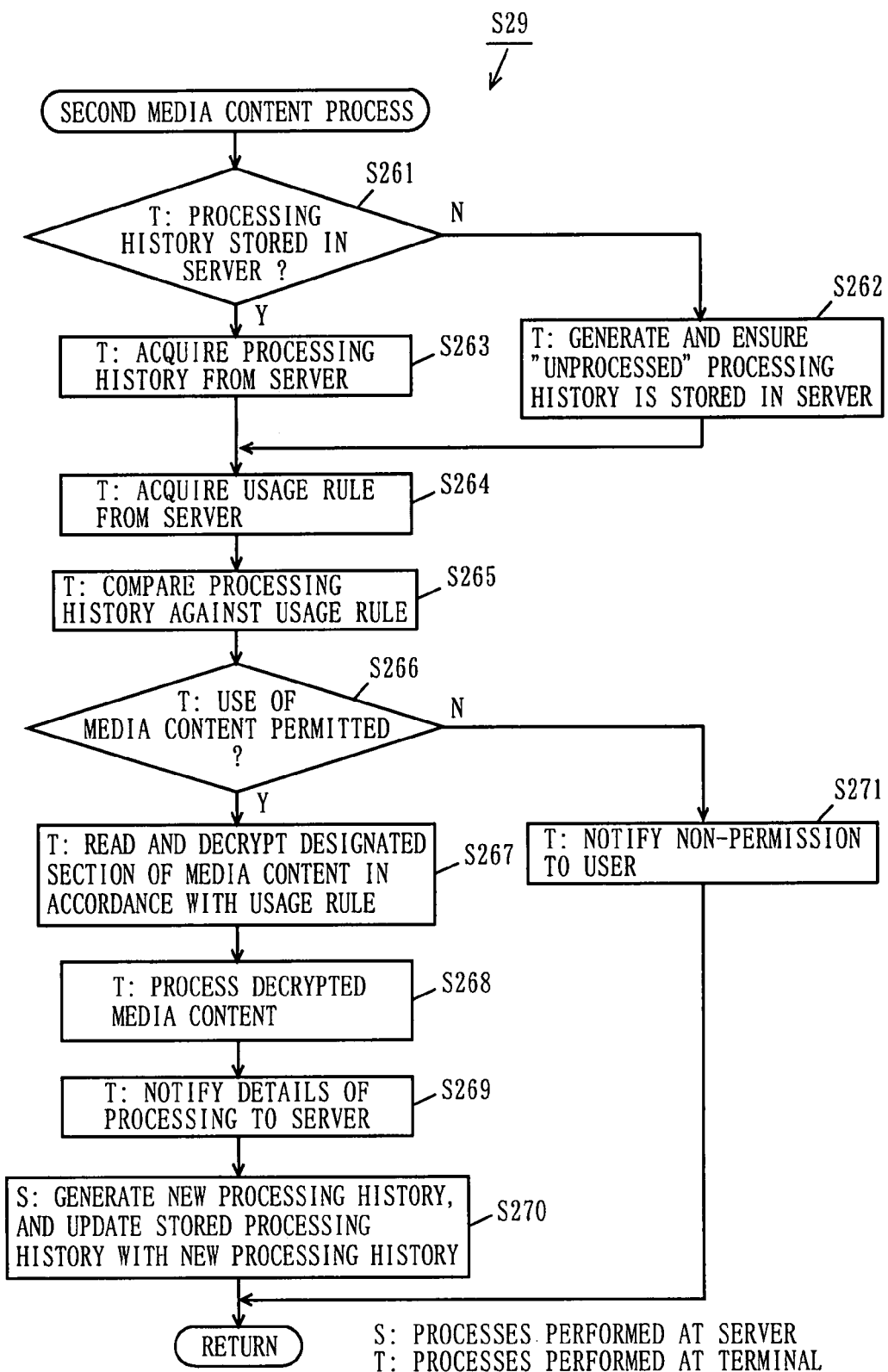
FIG. 19 is a flowchart illustrating the details of step S29 in FIG. 15.

FIG. 19 is a flowchart illustrating the details of step S29. After an execution program is activated at step S28 of FIG. 15, the control unit 22 of the terminal 2 checks whether or not a processing history for the media content to be processed is stored in the usage rule/processing history database 103 (step S261). At step S261, an inquiry is transmitted from the control unit 22 of the terminal 2 to the control unit 11 of the server 1, and a reply is transmitted from the control unit 11 of the server 1 to the control unit 22 of the terminal 2. If no such processing history is stored in the server 1, the control unit 22 generates a processing history representing "unprocessed", and ensures that the generated processing history is stored in the usage rule/processing history database 103 (step S262). At step S262, the control unit 22 of the terminal 2 transmits the processing history representing "unprocessed" to the control unit 11 of the server 1. If a relevant processing history is stored in the server 1, the control unit 22 acquires that processing history from the usage rule/processing history database 103 via the network 3 (step S263).

Next, the control unit 22 of the terminal 2 acquires the usage rule from the usage rule/processing history database 103 via the network 3 (step S264). Then, the control unit 22 compares the processing history acquired at step S263 (or generated at step S262) against the usage rule acquired at step S264 (step S265), and determines whether or not the use of the media content is permitted (step S266).

If the use of the media content is permitted, steps S267 and S268 are performed. Steps S267 and S268 are identical to steps S167 and S168 of FIG. 12. Next, the control unit 22 of the terminal 2 notifies the details of the processing at step S268 to the control unit 11 of the server 1 (step S269).

Upon receiving the notification of the details of the processing, the control unit 11 of the server 1 generates a new processing history, and overwrites the new processing history so as to replace the processing history stored in the usage rule/processing history database 103 (step S270).

If step S266 finds that the use of the media content is not permitted, the control unit 22 notifies this to the user via the input/output unit 21 (step S271). After the second media content process is thus completed, step S30 of FIG. 15 is performed.

As in the first embodiment, it is also applicable in the present embodiment to update the usage rule without storing the processing history in order to determine the availability of a media content, or separately transmit a media content and an execution program. In accordance with the above-described configuration, a usage rule is obtained from the server 1 before the terminal 2 processes a media content, and the availability of the media content is determined based on the acquired usage rule. Alternatively, the server 1 may determine the availability of the media content based on the usage rule stored in the server 1, and notify the result of the determination to the terminal 2. In the case where such a configuration is adopted, an availability determination program may be added to the ROM included in the control unit 11, and the availability determination function (e.g., availability determination subroutine) may be omitted from the execution program which is distributed to the terminal 2. In accordance with the above-described configuration, the server 1 generates and stores a usage rule. Alternatively, a separate server may generate a usage rule to be stored in the server 1.

As described above, in the media contents distribution system according to the present embodiment, a media content and an execution program are distributed to a terminal, whereas a usage rule is kept under management at the server. As a result, in addition to the effects attained according to the first embodiment, it becomes possible to prevent tampering of usage rules at the terminals.

Third Embodiment

According to the third embodiment, an execution program and a usage rule are distributed to a terminal, whereas a media content is kept under management at the server. Thus, the third embodiment differs from the first embodiment, which provides that a media content, an execution program, and a usage rule are distributed to a terminal. Hereinafter, the differences between the first embodiment and the third embodiment will be described in detail.

As in the case of the first embodiment, the media contents distribution system according to the present embodiment has a configuration as illustrated in FIGS. 1 to 3. The structure of the storage unit 12 is identical to that of the storage unit 12 in the first embodiment (see FIG. 4). However, in the present embodiment, a media content is stored in the media content database 101 without being encrypted.

Figure 20:
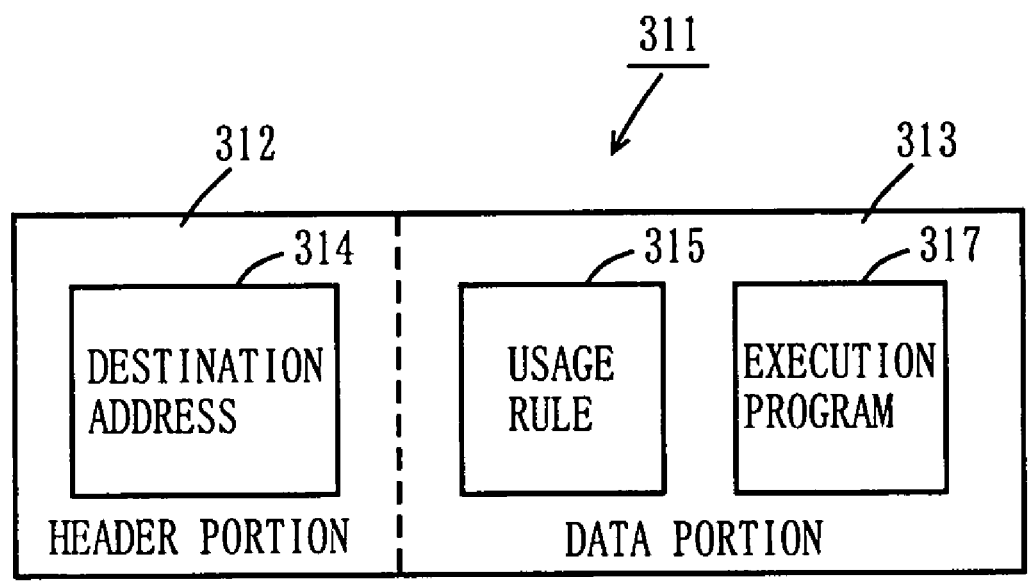
FIG. 20 is a diagram illustrating an exemplary structure of a capsule which is transmitted in a media contents distribution system according to the third embodiment of the present invention.

FIG. 20 is a diagram illustrating an exemplary structure of a capsule which is transmitted from the server 1 to the terminal 2. As shown in FIG. 20, a capsule 311 includes a header portion 312 and a data portion 313. The header portion 312 stores a destination address 314 of the capsule 311. The data portion 313 stores a usage rule 315 and an execution program 317.

In the present embodiment, the usage rule and the processing history are treated in the same manner as in the first embodiment. Although the first embodiment works in such a manner that a media content is distributed to the terminal 2 and stored in its memory unit 24, the present embodiment is characterized in that media contents remain stored in the storage unit 12 of the server 1, without being distributed to the terminals 2. Only when a terminal 2 activates an execution program in order to process a media content is the media content actually read from the storage unit 12 to be transferred to the processing unit 25 of the terminal 2. The processing unit 25 keeps receiving the media content from the server 1 via the network 3 as the received media content is processed by the processing unit 25. Such a process is generally referred to as "streaming".

Figure 21:
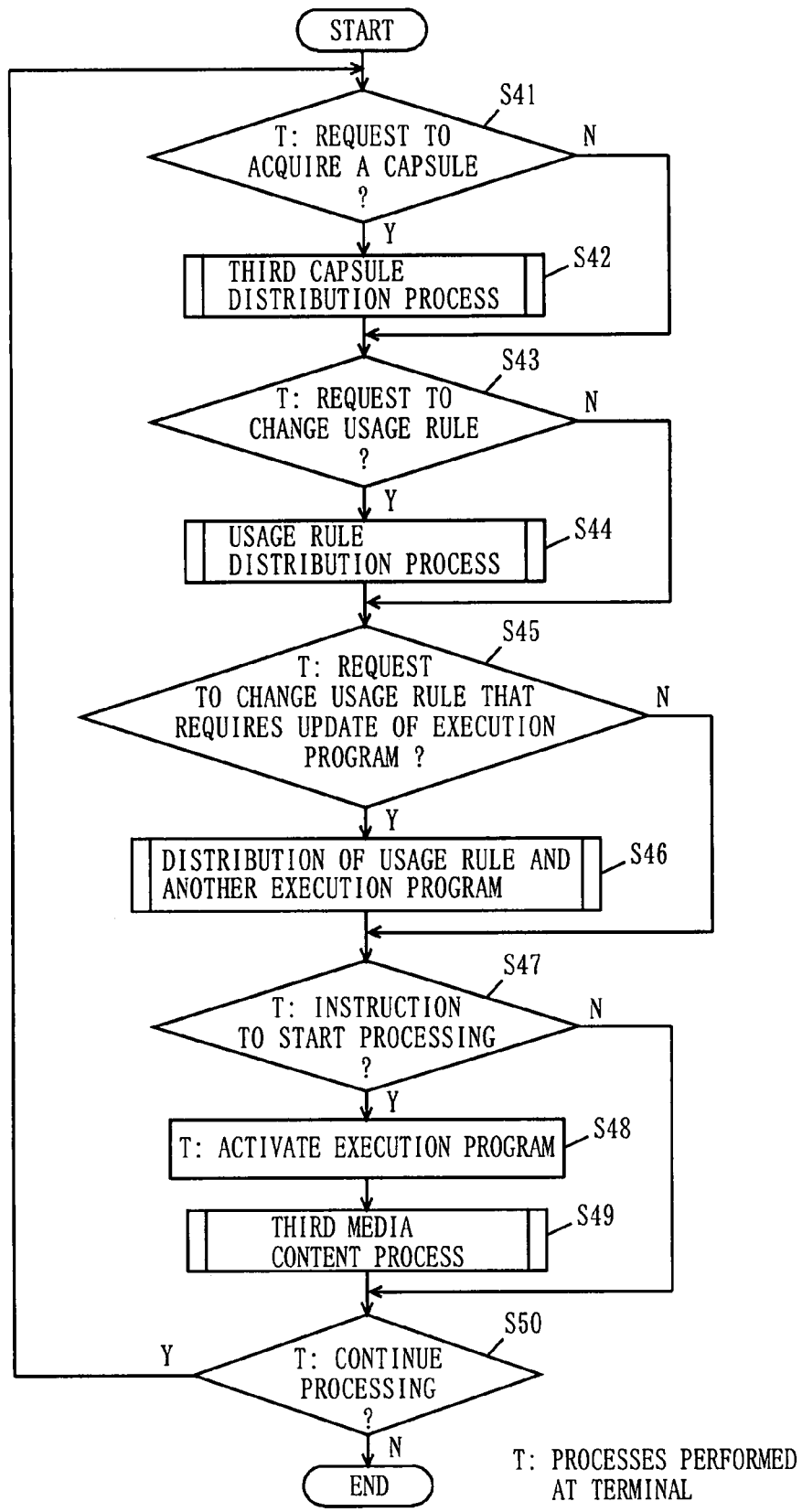
FIG. 21 is a main flowchart illustrating the operation of the media contents distribution system according to the third embodiment of the present invention.

FIG. 21 is a main flowchart illustrating the operation of the media contents distribution system according to the present embodiment. The flowchart of FIG. 21 is identical to the flowchart of FIG. 8 except for steps S42 and S49. Hereinafter, the details of steps S42 and S49 will be described.

Figure 22:
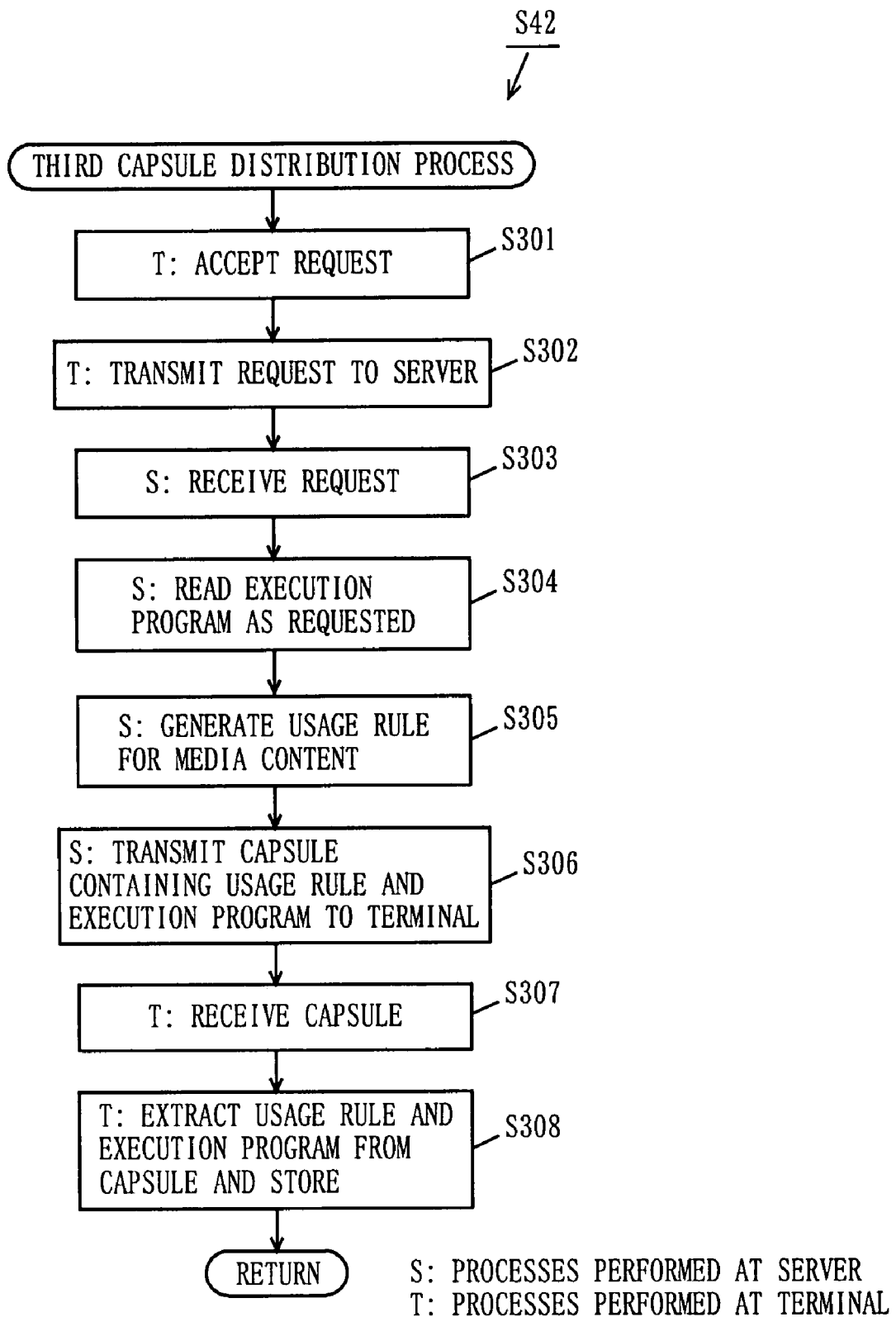
FIG. 22 is a flowchart illustrating the details of step S42 in FIG. 21.

FIG. 22 is a flowchart illustrating the details of step S42. The flowchart of FIG. 22 is identical to the flowchart of FIG. 9 except for the following three steps. Firstly, at step S304, the control unit 11 reads an execution program corresponding to a received request from the execution program database 102, without reading a media content. Secondly, at step S306, the control unit 11 encapsulates the execution program read at step S304 and a usage rule generated at step S305 into a capsule 311 as shown in FIG. 20, and transmits the capsule 311 to the terminal 2 by means of the communication unit 13, without encapsulating the media content in the capsule 311 for transmission. Thirdly, at step S308, the control unit 22 extracts the usage rule 315 and the execution program 317 from the received capsule 311, and stores them to the memory unit 24. Herein, it will be appreciated that the control unit 22 does not extract a media content from the capsule 311. After a third capsule distribution process is thus completed, step S43 of FIG. 21 is performed.

Figure 23:
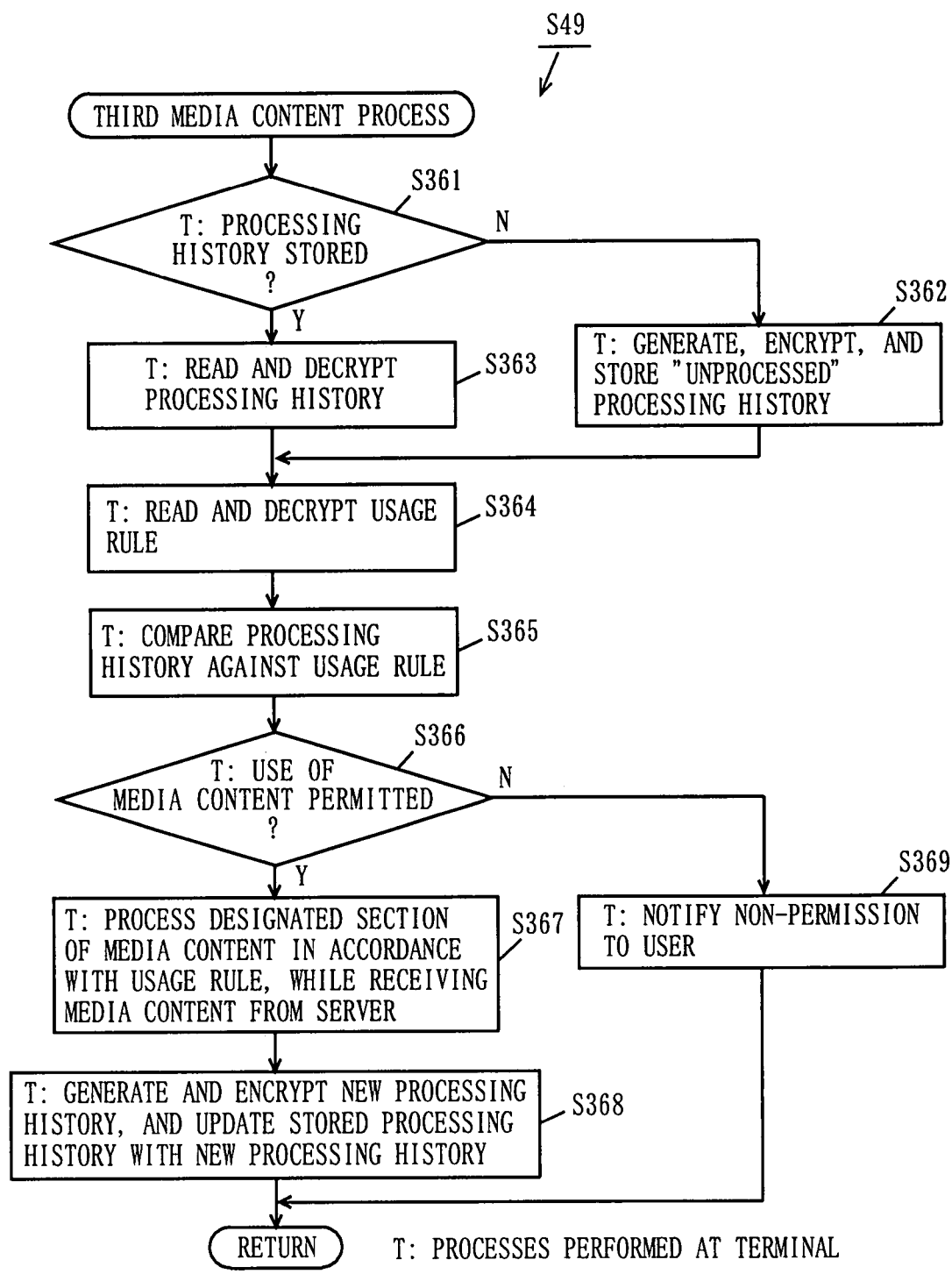
FIG. 23 is a flowchart illustrating the details of step S49 in FIG. 21.

FIG. 23 is a flowchart illustrating the details of step S49. The flowchart of FIG. 23 is identical to the flowchart of FIG. 12 except for step S367. At step S367, the control unit 22 instructs the processing unit 25 to process a designated section of the media content to be processed while receiving the media content from the media content database 101 via the network 3, in accordance with the usage rule. As a result, for example, the section spanning the first thirty minutes of the media content may be read from the server 1 and played back. After a third media content process is thus completed, step S50 of FIG. 21 is performed.

As in the first embodiment, it is also applicable in the present embodiment to update the usage rule without storing the processing history in order to determine the availability of a media content, or separately transmit an execution program and a usage rule. In accordance with the above-described configuration, media contents are stored in the server 1 without being encrypted. Alternatively, the media contents may be stored in an encrypted form; in this case, at step S367, the terminal 2 processes the media content received from the server 1 after decrypting the media content.

As described above, in the media contents distribution system according to the present embodiment, an execution program and a usage rule are distributed to a terminal, whereas a media content is kept under management at the server. As a result, in addition to the effects attained according to the first embodiment, it becomes possible to prevent unauthorized duplication of the media contents at the terminals.

Fourth Embodiment

According to the fourth embodiment of the present invention, an execution program is distributed to a terminal, whereas a media content and a usage rule are kept under management at the server. Thus, the fourth embodiment differs from the second embodiment, which provides that a media content and an execution program are distributed to a terminal, whereas a usage rule is kept under management at the server. Hereinafter, the differences between the second embodiment and the fourth embodiment will be described in detail.

As in the case of the first and second embodiments, the media contents distribution system according to the present embodiment has a configuration as illustrated in FIGS. 1 to 3. The structure of the storage unit 12 is identical to that of the storage unit 12 in the second embodiment (see FIG. 13). However, in the present embodiment, a media content is stored in the media content database 101 without being encrypted, as is the case with the third embodiment.

Figure 24:
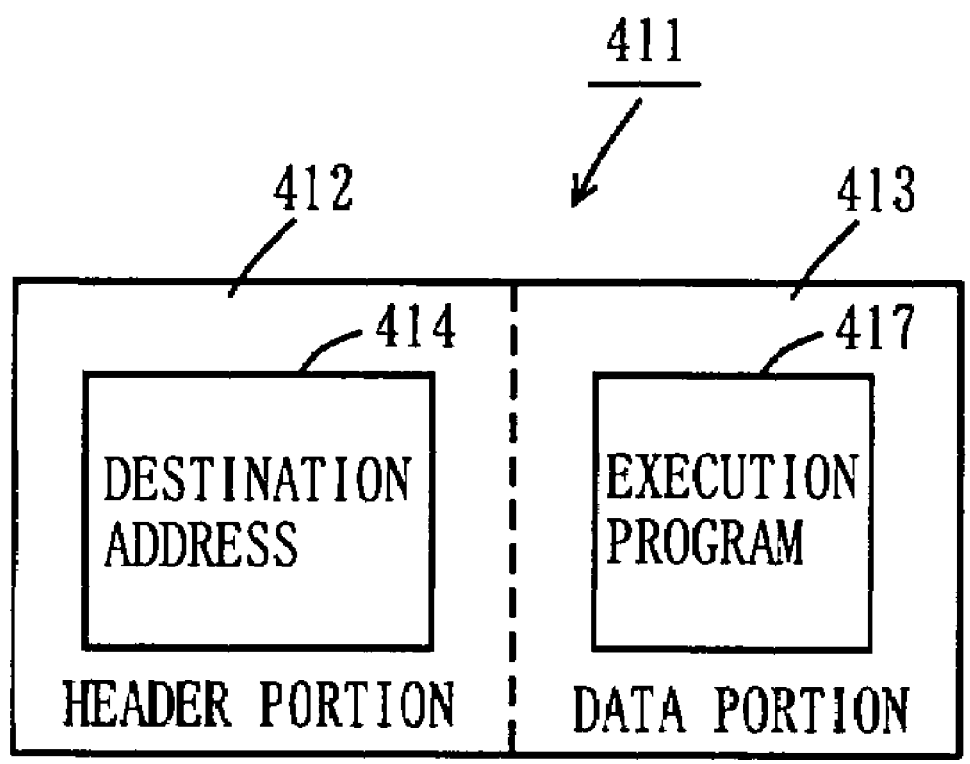
FIG. 24 is a diagram illustrating an exemplary structure of a capsule which is transmitted in a media contents distribution system according to the fourth embodiment of the present invention.

FIG. 24 is a diagram illustrating an exemplary structure of a capsule which is transmitted from the server 1 to a terminal 2. As shown in FIG. 24, a capsule 411 includes a header portion 412 and a data portion 413. The header portion 412 stores a destination address 414 of the capsule 411. The data portion 413 stores an execution program 417.

In the present embodiment, the usage rule and the processing history are treated in the same manner as in the second embodiment. In the present embodiment, the media content is treated in the same manner as in the third embodiment.

Figure 25:
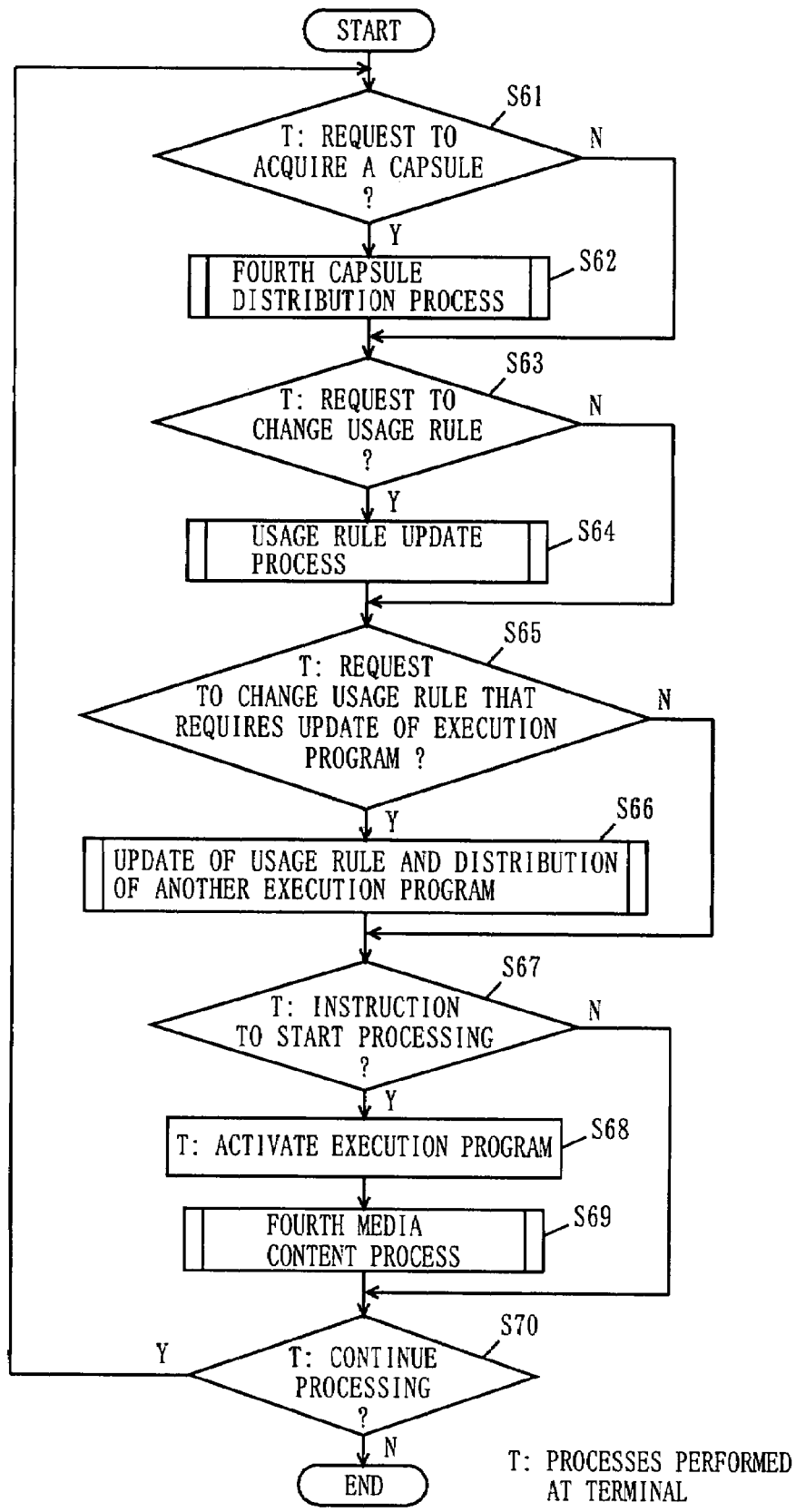
FIG. 25 is a main flowchart illustrating the operation of the media contents distribution system according to the fourth embodiment of the present invention.

FIG. 25 is a main flowchart illustrating the operation of the media contents distribution system according to the present embodiment. The flowchart of FIG. 25 is identical to the flowchart of FIG. 15, except for steps S62 and S69. Hereinafter, the details of steps S62 and S69 will be described.

Figure 26:
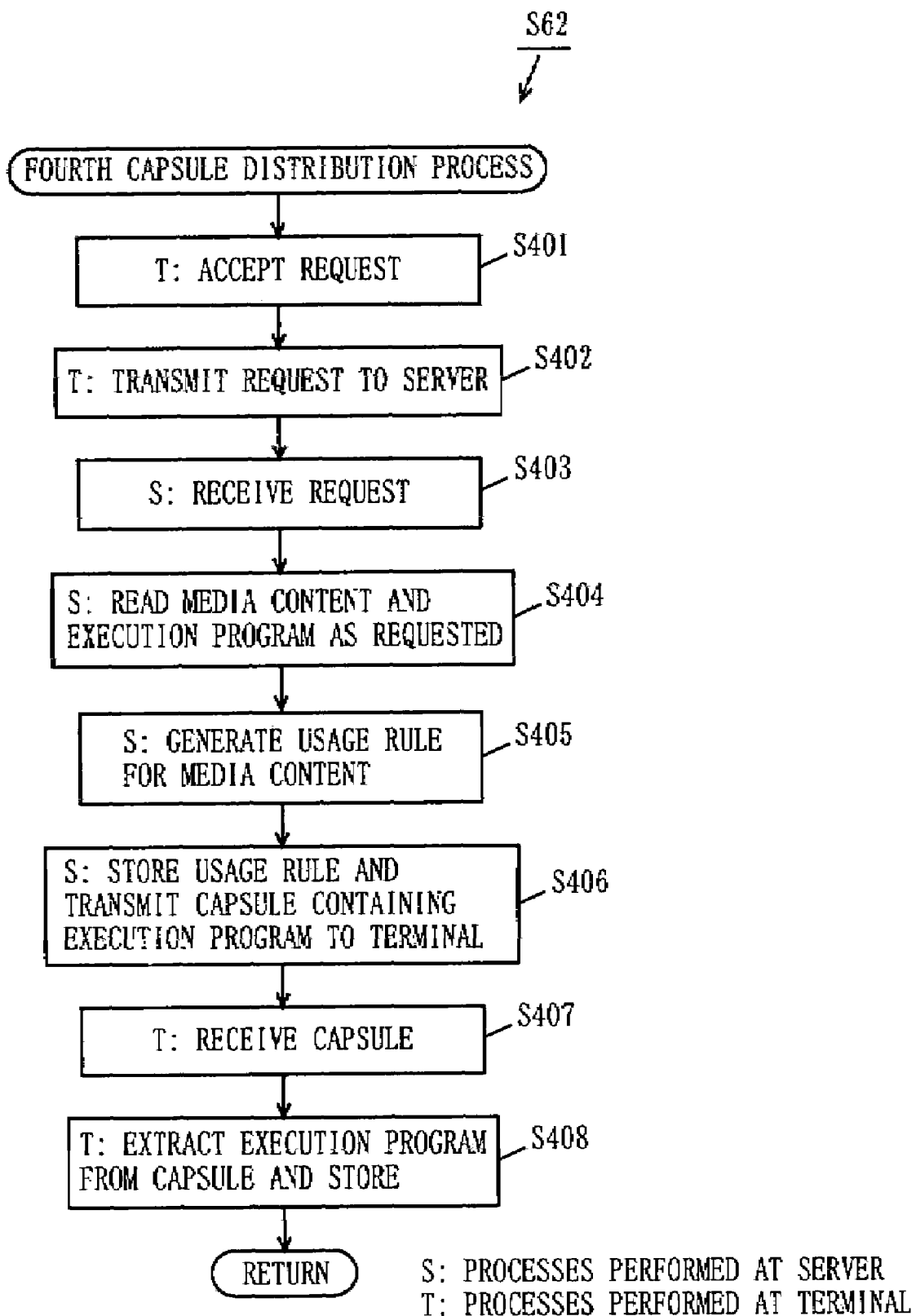
FIG. 26 is a flowchart illustrating the details of step S62 in FIG. 25.

FIG. 26 is a flowchart illustrating the details of step S62. The flowchart of FIG. 26 is identical to the flowchart of FIG. 16 except for the following three steps. Firstly, step S404 is identical to step S304 of FIG. 22, where the control unit 11 does not read a media content. Secondly, at step S406, the control unit 11 encapsulates an execution program read at step S404 into a capsule 411 as shown in FIG. 24, transmits the capsule 411 to a terminal 2 by means of the communication unit 13, and stores a usage rule generated at step S405 to the usage rule/processing history database 103, without encapsulating the media content in the capsule 411 for transmission. Thirdly, at step S408, the control unit 22 extracts the execution program 417 from the received capsule 411, and stores the execution program 417 to the memory unit 24. Herein, it will be appreciated that the control unit 22 does not extract a media content from the capsule 411. After a fourth capsule distribution process is thus completed, step S63 of FIG. 25 is performed.

Figure 27:
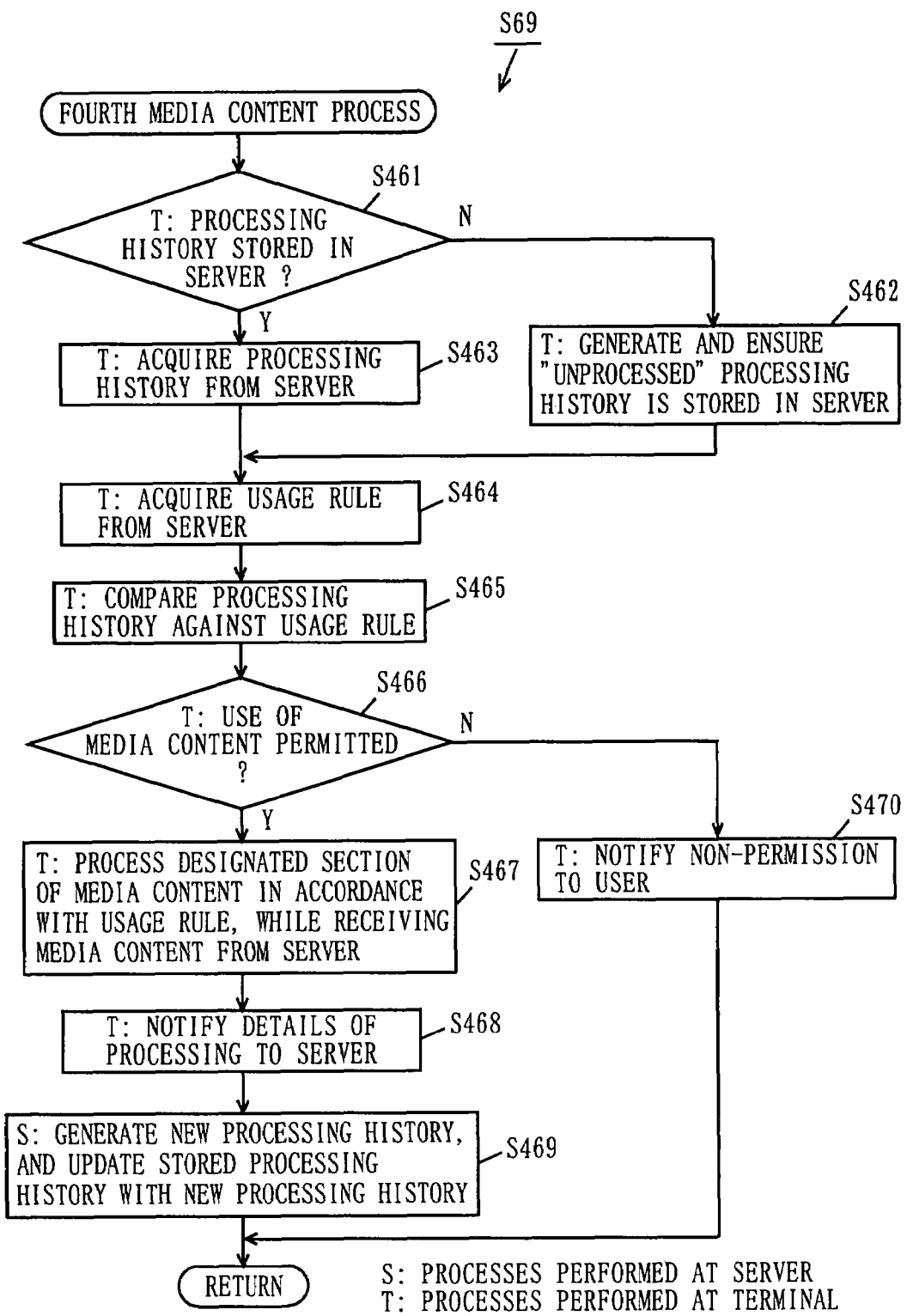
FIG. 27 is a flowchart illustrating the details of step S69 in FIG. 25.

FIG. 27 is a flowchart illustrating the details of step S69. The flowchart of FIG. 27 is identical to the flowchart of FIG. 19, except for step S467. Step S467 is identical to step S367 of FIG. 23. After a fourth media content process is thus completed, step S70 of FIG. 25 is performed.

As in the first embodiment, it is also applicable in the present embodiment to update the usage rule without storing the processing history in order to determine the availability of a media content. As in the second embodiment, it is also applicable in the present embodiment for the server 1 to determine the availability of a media content based on a usage rule stored in the server 1 itself and notify the result of the determination to the terminal 2. As in the third embodiment, it is also applicable in the present embodiment to store media contents in an encrypted form in the server 1.

As described above, in the media contents distribution system according to the present embodiment, an execution program is distributed to the terminal 2, whereas a media content and a usage rule are kept under management at the server 1. As a result, in addition to the effects attained according to the first embodiment, it becomes possible to prevent unauthorized duplication of the media contents or tampering of the usage rules at the terminals 2.

In the media contents distribution system according to any of the first to fourth embodiments of the present invention, a billing function, a middleware distribution function, a selective distribution function of media contents and the like, and other like functions can be added. Hereinafter, further embodiments based on the first embodiment, where one of the aforementioned extra functions is additionally introduced, will be described.

Fifth Embodiment

A media contents distribution system according to the fifth embodiment of the present invention is based on the first embodiment, where a billing function is additionally introduced. In the present embodiment, a billing process for a terminal (i.e., a user of a terminal) is performed at the server.

Figure 28:
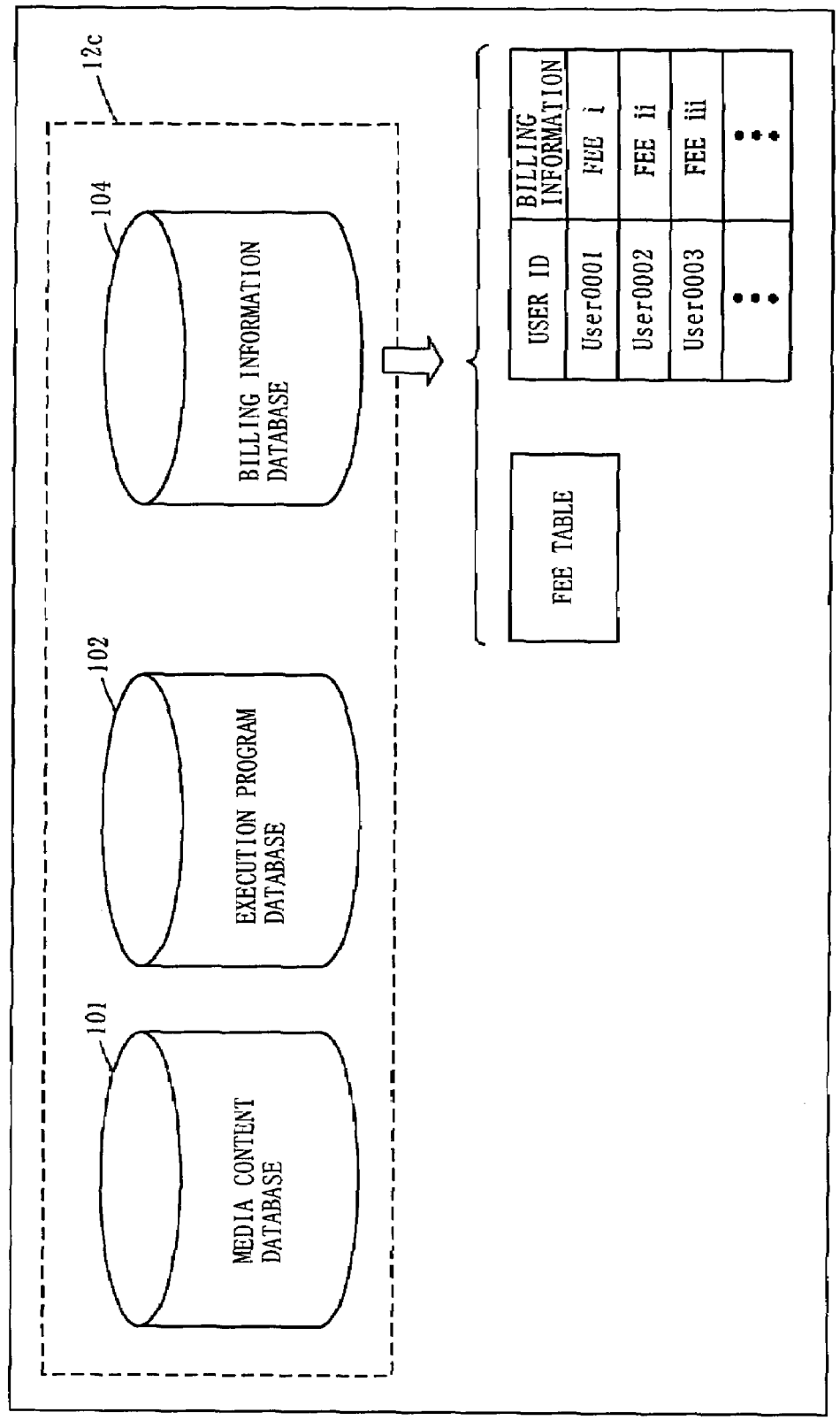
FIG. 28 is a diagram illustrating the details of a storage unit in the media contents distribution system according to the fifth embodiment of the present invention.

As in the case of the first embodiment, the media contents distribution system according to the present embodiment has a configuration as illustrated in FIGS. 1 to 3. FIG. 28 is a diagram illustrating the details of a storage unit 12 according to the present embodiment. FIG. 28 shows a storage unit 12c, which is a more detailed representation of the storage unit 12 shown in FIG. 1. The storage unit 12c internalizes a media content database 101, an execution program database 102, and a billing information database 104. Since the details of the media content database 101 and the execution program database 102 are similar to those in the first embodiment (see FIG. 4), the descriptions thereof are omitted from FIG. 28.

The billing information database 104 stores identifiers of users (user IDs) of the terminals 2, billing information concerning the respective users, and a fee table. The billing information represents a sum for the user of each terminal 2 to pay to the provider of a media content. The fee table describes fees for using the respective media contents stored in the media content database 101. More specifically, the fee table describes fees for each media content, in accordance with an allowable section for use, a mode of use (e.g., playback, duplication, or editing), an allowable number of times of use, an allowable total time of use, an allowable period of use, and the like.

The media contents distribution system according to the present embodiment operates in accordance with a flowchart which is based on the flowcharts shown in FIGS. 8 to 12, with a billing process being additionally introduced at three points. Specifically, a billing process is inserted at each point immediately after a usage rule is generated, i.e., immediately after step S105 (FIG. 9), step S124 (FIG. 10), and step S145 (FIG. 11).

Figure 29:
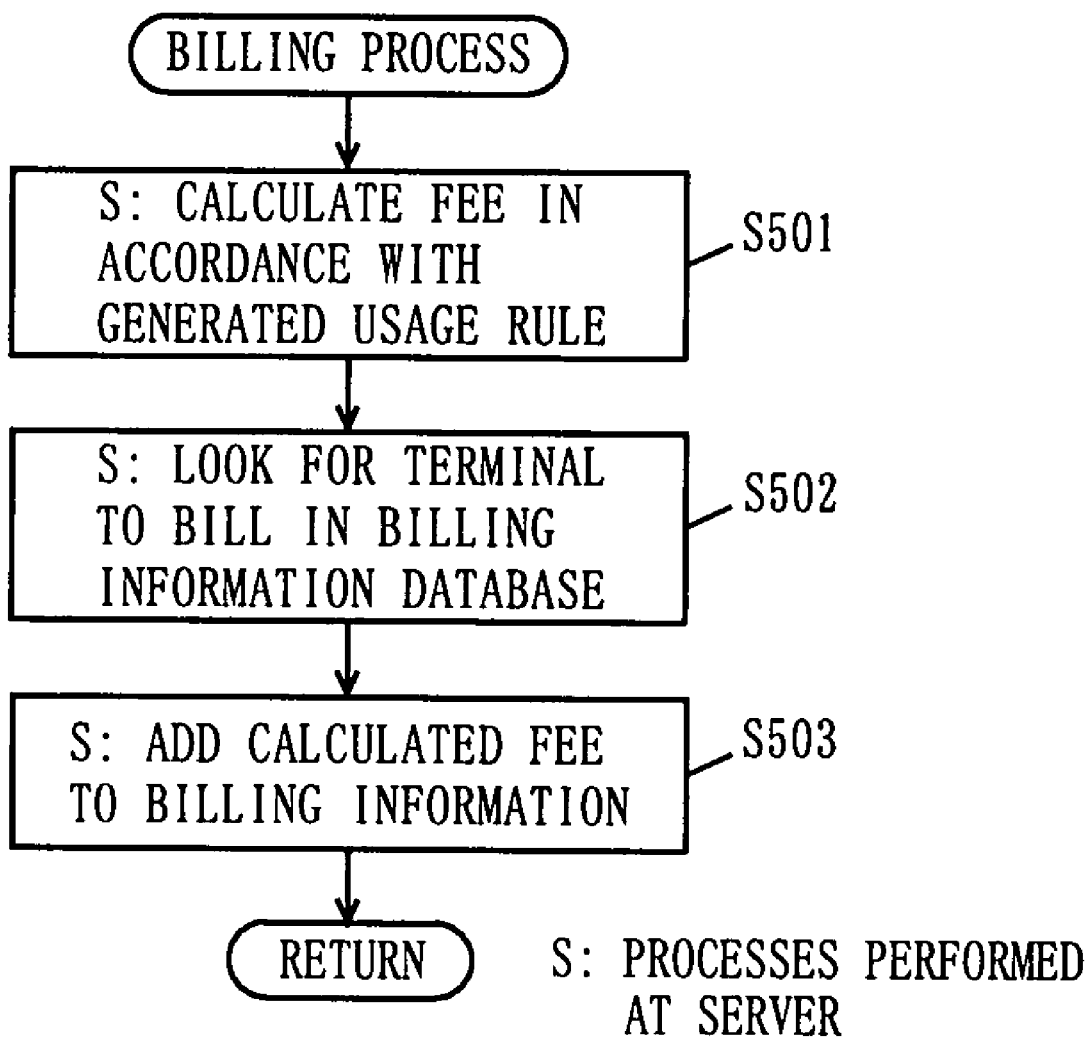
FIG. 29 is a flowchart illustrating the details of a billing process performed by the media contents distribution system according to the fifth embodiment of the present invention.

FIG. 29 is a flowchart illustrating the details of the billing process. The billing process is performed by the control unit 11 immediately after a usage rule is generated. Based on the fee table stored in the billing information database 104, the control unit 11 calculates a fee in accordance with the generated usage rule (step S501). Next, the control unit 11 looks for a user of a terminal 2 which is a recipient of the usage rule, from within the billing information database 104 (step S502). Then, the control unit 11 adds the fee calculated at step S501 to the billing information for the user detected at step S502 (step S503). Through such a billing process, a fee which is in accordance with the generated usage rule is calculated. By summing up such fees, a total billing for each user can be determined.

According to the present embodiment, the payment of usage fees is made on a predetermined date (e.g., the fifteenth day of every month), based on the billing information stored in the billing information database 104. The payment of the usage fees may be automatically made, for example, by the server 1 communicating with a host computer (not shown) of a bank or a credit card company via the network 3.

As described above, in the media contents distribution system according to the present embodiment, a server bills a terminal in accordance with a usage rule which is set. The usage rule may include, for example, an allowable section (of a media content) of use, an allowable number of times of use, an allowable total time of use, and an allowable period of use. By employing an allowable section for use, it becomes possible to charge a fee which is in accordance with the length of the section of a media content which has been used. By employing an allowable number of times of use, it becomes possible to charge a fee which is in accordance with the number of times which a media content has been used. By employing an allowable total time of use, it becomes possible to charge a fee which is in accordance with the amount of time for which a media content has been used. By employing an allowable period of use, it becomes possible to charge a fee which is in accordance with the length of the allowable period of use for a media content. It is also possible to charge a fee which is in accordance with the mode of use (e.g., playback, duplication, editing) of a media content. As a result, a user of a terminal may only need to pay a fee according to the extent to which the user has actually used the media content.

Although a prepaid method in which billing is performed at the time of generating a usage rule is adopted in the above-described configuration, a "postpaid" method may alternatively be adopted, in which billing is performed as the user actually uses a media content. In this case, the control unit 11 may calculate fees by referring to the processing history which is notified from each terminal 2.

Sixth Embodiment

A media contents distribution system according to the sixth embodiment of the present invention is based on the first embodiment, where a middleware distribution function is additionally introduced. When there are terminals which are diverse in hardware construction or OS (operating system) environment, it may actually be impossible for some of the terminals to execute a certain execution program distributed from the server. Therefore, according to the present embodiment, middleware is distributed, together with an execution program, from the server to a terminal. The middleware is used for constructing an operating environment for the execution program.

Figure 30:
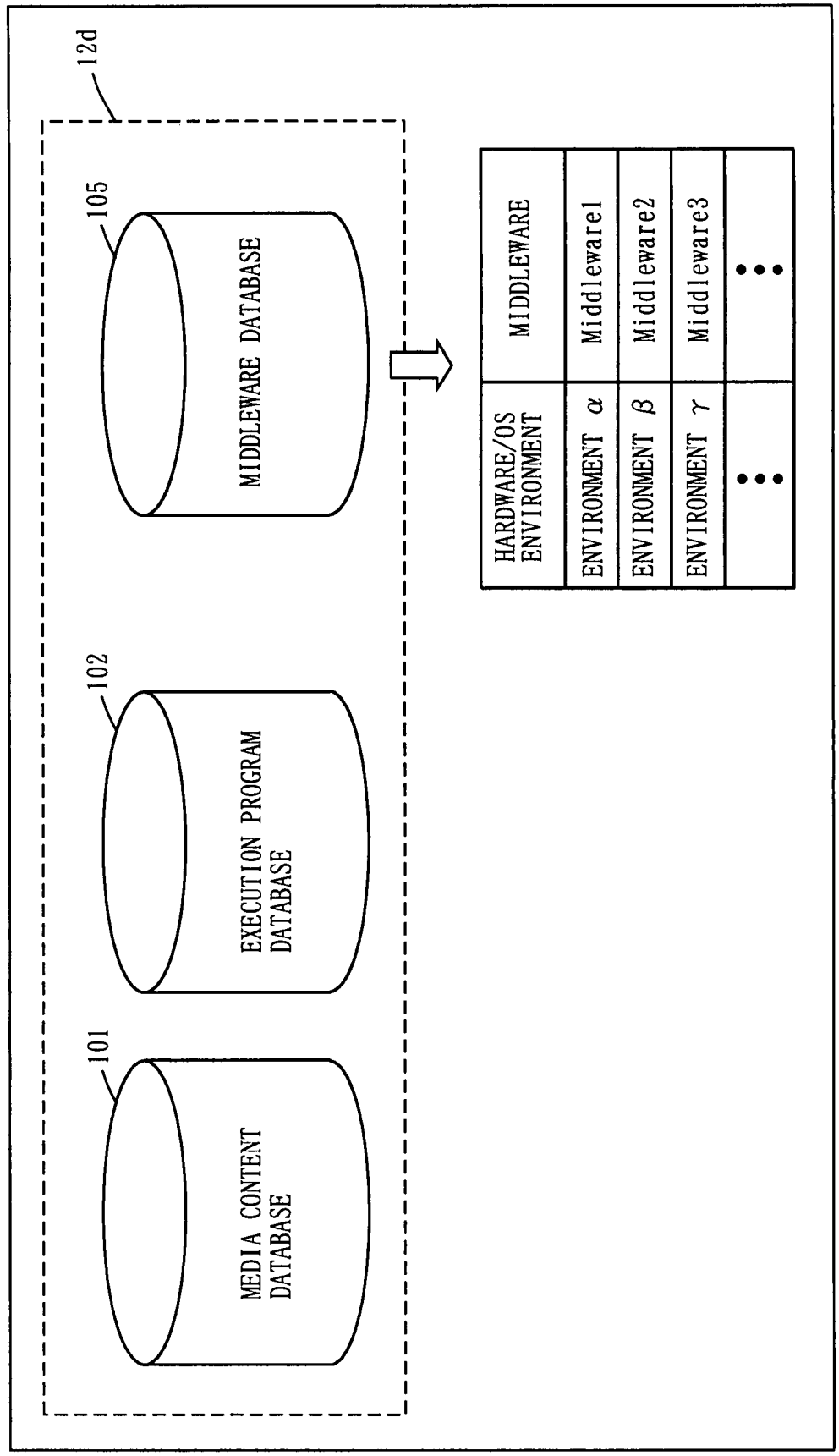
FIG. 30 is a diagram illustrating the details of a storage unit in the media contents distribution system according to the sixth embodiment of the present invention.

As in the case of the first embodiment, the media contents distribution system according to the present embodiment has a configuration as illustrated in FIGS. 1 to 3. FIG. 30 is a diagram illustrating the details of the storage unit 12 according to the present embodiment. FIG. 30 shows a storage unit 12$d$, which is a more detailed representation of the storage unit 12 shown in FIG. 1. The storage unit 12$d$ internalizes a media content database 101, an execution program database 102, and a middleware database 105. Since the details of the media content database 101 and the execution program database 102 are similar to those in the first embodiment (see FIG. 4), the descriptions thereof are omitted from FIG. 30.

In the case where a plurality of types of hardware and/or OS are employed by the terminals 2, the middleware database 105 stores a plurality of corresponding middleware programs. FIG. 30 illustrates a manner in which middleware programs such as "Middleware 1", "Middleware 2", and "Middleware 3" are stored in the middleware database 105 in the case where hardware and/or OS employed by the terminals 2 can be classified into "environment α", "environment β", "environment γ", etc. It is assumed that any execution program stored in the execution program database 102 can operate on all middleware programs stored in the middleware database 105.

Figure 31:
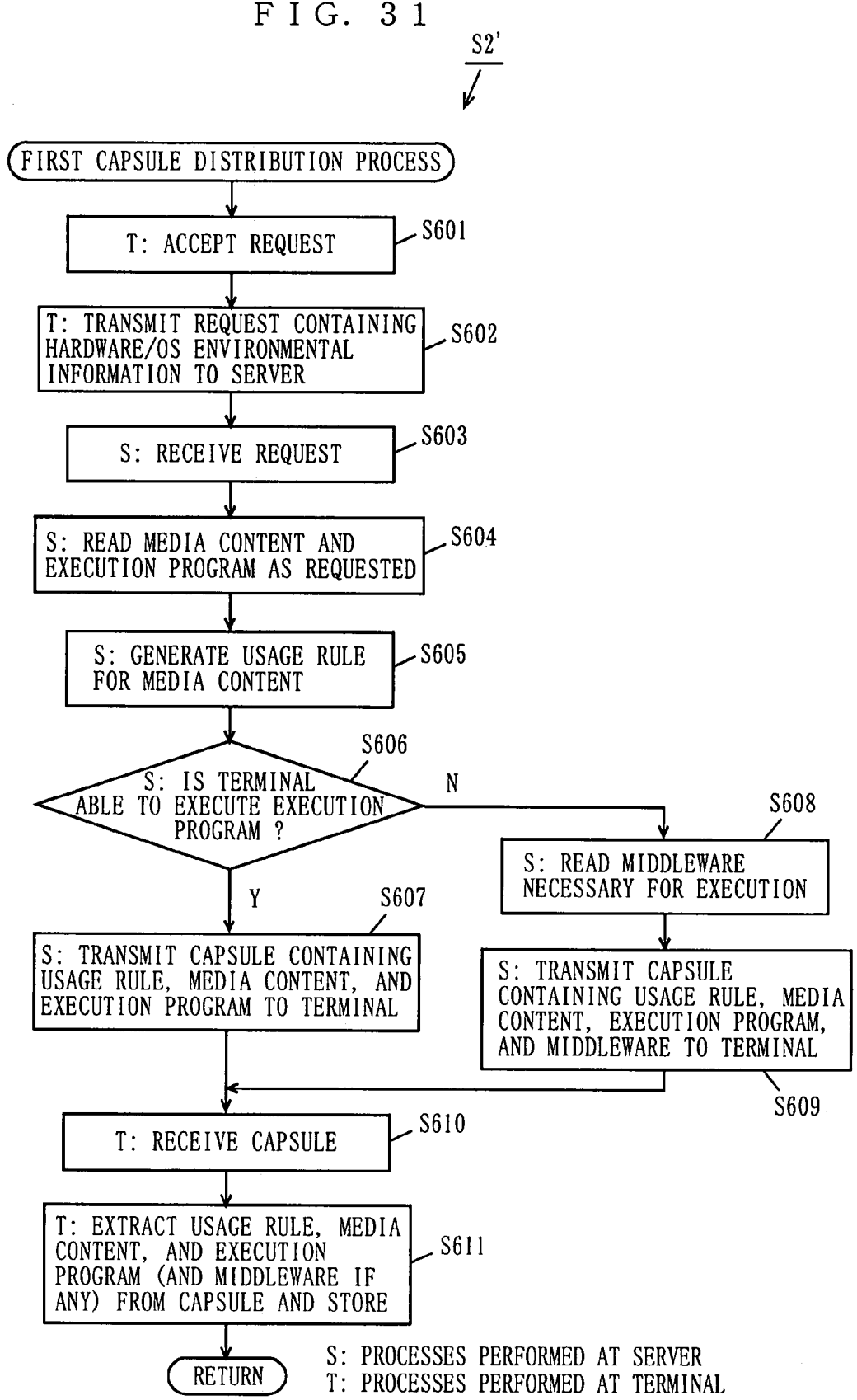
FIG. 31 is a flowchart illustrating the details of step S2 performed by the media contents distribution system according to the sixth embodiment of the present invention.

The media contents distribution system according to the present embodiment operates in accordance with the flowcharts shown in FIG. 8, FIG. 10, FIG. 12, FIG. 31, and FIG. 33. FIG. 31 is a flowchart illustrating the details of step S2 of FIG. 8. The flowchart of FIG. 31 is identical to the flowchart of FIG. 9 except for the following five steps. Firstly, when transmitting at step S602 a request accepted at step S601 to the server 1, the control unit 11 includes information concerning the hardware and/or OS employed at the terminal 2 (hereinafter referred to as "environmental information") in the request for transmission. Secondly, at step S606, the control unit 11 determines whether or not an execution program read at step S604 is executable by the recipient terminal 2, based on the environmental information transmitted at step S602. Thirdly, if the result of the determination at step S606 is "NO", the control unit 11 reads at step S608 a middleware program which is compatible with the terminal 2 from the middleware database 105. Fourthly, at step S609, the control unit 11 encapsulates the media content and the execution program read at step S604, a usage rule generated at step S605, and the middleware program read at step S608 into a capsule, and transmits the capsule to the terminal 2 by means of the communication unit 13. Fifthly, at step S611, the control unit 22 extracts the usage rule, the media content, and the execution program from the capsule received at step S610 and stores them to the memory unit 24, and applies similar processes to any middleware program contained in the capsule. Thus, in accordance with step S2 with a middleware distribution function additionally incorporated, it is possible to distribute middleware at the time of distributing an execution program to the terminal 2, as necessary.

Figure 32:
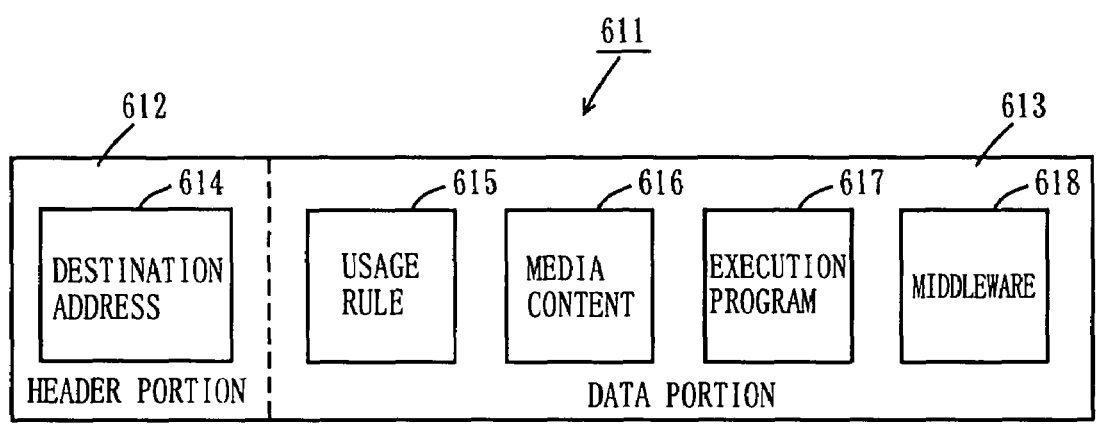
FIG. 32 is a diagram illustrating an exemplary structure of a capsule which is transmitted in a media contents distribution system according to the sixth embodiment of the present invention.

FIG. 32 is a diagram illustrating an exemplary structure of a capsule which is transmitted from the server 1 to a terminal 2 at step S609. As shown in FIG. 32, a capsule 611 includes a header portion 612 and a data portion 613. The header portion 612 stores a destination address 614 of the capsule 611. The data portion 613 stores a usage rule 615, a media content 616, an execution program 617, and a middleware program 618.

Figure 33:
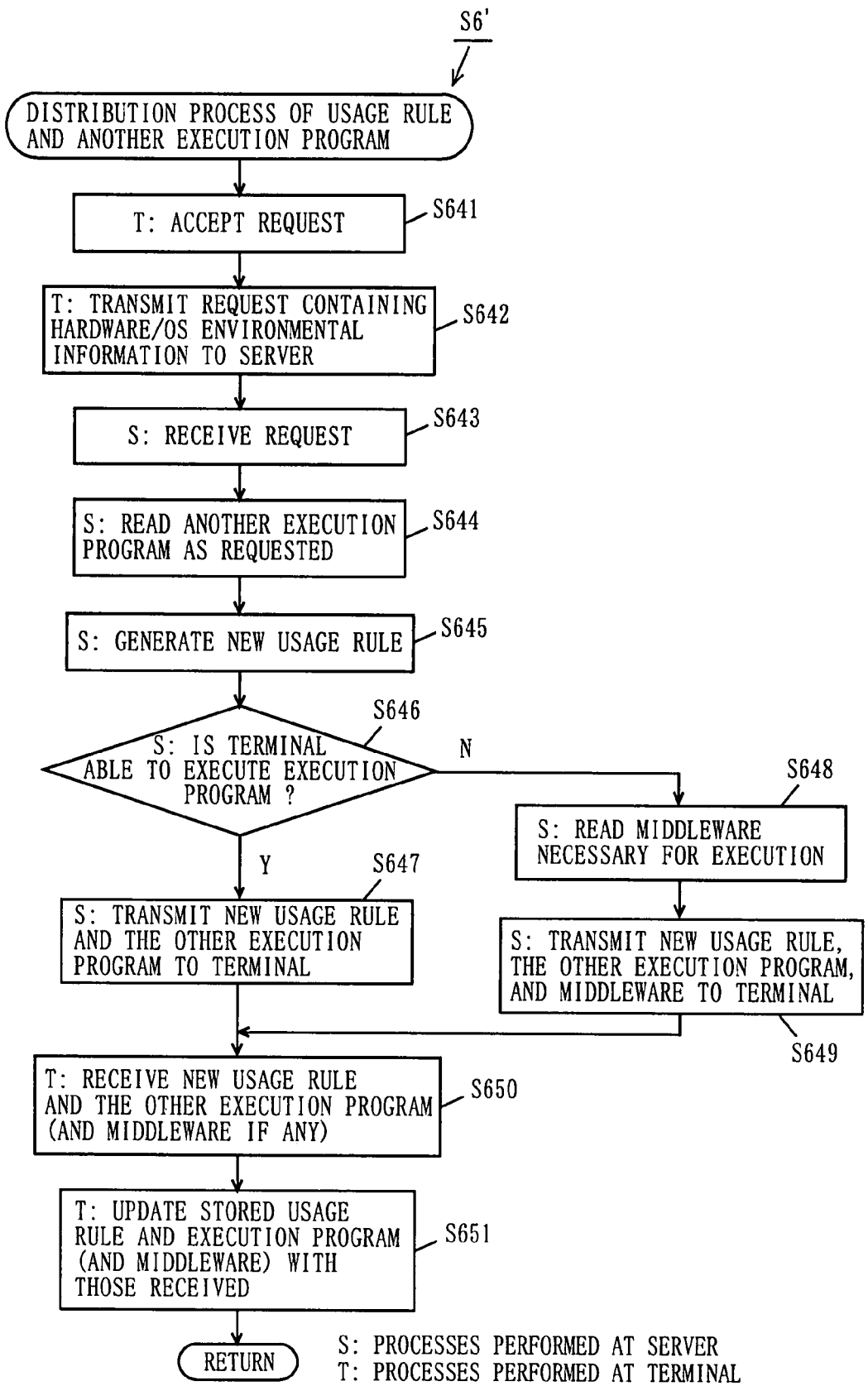
FIG. 33 is a flowchart illustrating the details of step S6 performed by the media contents distribution system according to the sixth embodiment of the present invention.

FIG. 33 is a flowchart illustrating the details of step S6 of FIG. 8. The flowchart of FIG. 33 is identical to the flowchart of FIG. 11, except for the following six steps. Firstly, step S642 is identical to step S602 of FIG. 31. Secondly, step S646 is identical to step S606 of FIG. 31. Thirdly, step S648 is identical to step S608 of FIG. 31. Fourthly, at step S649, the control unit 11 transmits an execution program read at step S644, a usage rule generated at step S645, and a middleware program read at step S648 to the terminal 2 by means of the communication unit 13. Fifthly, when receiving at step S650 a new usage rule and another execution program transmitted from the server 1 by means of the communication unit 23, the control unit 22 also receives a middleware program, if any. Sixthly, when overwriting at step S651 the new usage rule and the other execution program received at step S650 so as to respectively replace the usage rule and the execution program stored in the memory unit 24, the control unit 22 applies similar processes to any middleware program received at step S650. In accordance with step S6 in which a middleware distribution function is additionally introduced, it becomes possible to distribute middleware, as necessary, when distributing a new execution program to a terminal 2.

Before activating the execution program at step S8 of FIG. 8, the control unit 22 activates the middleware program stored in the memory unit 24. As a result, an operating environment for being able to execute an execution program distributed from the server 1 and process a distributed media content is constructed at the terminal 2.

As described above, in the media contents distribution system according to the present embodiment, if a terminal 2 is unable to execute an execution program because of an incompatibility problem related to the hardware and/or OS of the terminal 2, a middleware program which is compatible with the hardware and/or OS employed at the terminal 2 is distributed from the server 1 to the terminal 2, together with an execution program. As a result, in spite of a diversity in hardware and/or OS, etc., it becomes possible to execute an execution program and process a distributed media content at various types of terminals 2.

Seventh Embodiment

A media contents distribution system according to the seventh embodiment of the present invention is based on the first embodiment, where a selective distribution function of media contents and the like is additionally introduced. According to the present embodiment, a media content and/or an execution program which is selected in accordance with the processing ability of a terminal, a state of communications, and similar factors is distributed from the server to the terminal.

As in the case of the first embodiment, the media contents distribution system according to the present embodiment has a configuration as illustrated in FIGS. 1 to 3. The structure of the storage unit 12 is identical to that of the storage unit 12 in the first embodiment (see FIG. 4). In the present embodiment, in order to realize a selective distribution function for media contents and the like, the media content database 101 stores a plurality of media contents which are directed to the same substance, and the execution program database 102 stores a plurality of execution programs which provide the same function. More specifically, the execution program database 102 stores a plurality of execution programs which provide the same function but require different levels of processing ability. The media content database 101 stores a plurality of media contents which are directed to the same substance but require different levels of processing ability, or a plurality of media contents which are directed to the same substance but differ in data amount per unit time.

In order to realize a selective distribution of media contents and the like, the server 1 utilizes tables illustrated in FIGS. 34 and 35. The table of FIG. 34 shows a correspondence between execution programs stored in the execution program database 102, functions of execution programs, and processing abilities of terminals 2. Each row of the table corresponds to a certain function of an execution program, whereas each column of the table corresponds to a certain processing ability of a terminal 2. The table of FIG. 34 illustrates that, if a given terminal 2 has a processing ability equivalent to that of a personal computer ("PC"), then a media content playback program "Program 11", a media content playback and duplication program "Program 21", a media content duplication program "Program 31", and a media content editing program "Program 41" are available. If a given terminal 2 has a processing ability equivalent to that of a mobile phone, then a media content playback program "Program 21" is available. Similar readings also apply to the columns corresponding to a terminal 2 having a processing ability equivalent to that of a set top box ("STB") or a personal digital assistant ("PDA"). Any slot which shows "-", instead of a program name, indicates that no corresponding execution program exists for that slot.

The table of FIG. 35 shows a correspondence between media contents stored in the media content database 101, content IDs, and encoding methods. Each row of the table corresponds to a certain content ID, whereas each column of the table corresponds to a certain encoding method. Note that the same content ID is assigned to media contents which are directed to the same substance even if their encoding methods are different. The table of FIG. 35 illustrates that as a result of encoding a media content having a content ID "Co0001" employing an MPEG2 high bit-rate method, an MPEG2 low bit-rate method, an MPEG4 high bit-rate method, or an MPEG4 low bit-rate method, "Contents1-2H.mpg", "Contents1-2L.mpg", "Contents1-4H.mp4", or "Contents1-4L.mp4" is obtained, respectively. Similar readings also apply to any media content having a content ID other than "Co0001".

At least one of the tables shown in FIG. 34 and FIG. 35 is stored in the control unit 11 or the storage unit 12. Employing these tables, the control unit 11 selects and distributes a media content or an execution program in the following manner. In the flowcharts of FIGS. 8 to 12, a media content is selected at step S104 of FIG. 9, and an execution program is selected at step S104 of FIG. 9 and at step S144 of FIG. 11.

In a first example, the server 1 may select and distribute an execution program based on the processing ability of a terminal 2. In this case, before distributing an execution program, the server 1 receives information concerning the processing ability of the terminal 2 (e.g., the processor performance, memory capacity, and the like of the terminal 2). By referring to the table shown in FIG. 34, the server 1 selects an execution program which is in accordance with the processing ability of the terminal 2, and transmits the selected execution program to the terminal 2. As a result, an execution program that has been optimally selected in accordance with the processing ability of the terminal 2 can be distributed from the server 1 to the terminal 2.

In a second example, the server 1 may select and distribute a media content based on the processing ability of a terminal 2. In this case, before distributing a media content, the server 1 receives information concerning the processing ability of the terminal 2. By referring to the table shown in FIG. 35, the server 1 selects a media content which is in accordance with the processing ability of the terminal 2, and transmits the selected media content to the terminal 2. As a result, a media content that has been optimally selected in accordance with the processing ability of the terminal 2 can be distributed from the server 1 to the terminal 2. Note that, in the first and second examples, the server 1 may receive from the terminal 2 an encoding method(s) which is executable by a particular terminal 2 as information concerning the processing ability of the terminal 2, and select a media content based on such information.

In a third example, the server 1 may select and distribute a media content based on a state of communications occurring between the server 1 and a terminal 2. In this case, before distributing a media content, the server 1 monitors the state of the network 3, and accordingly selects a media content and distributes the selected media content to the terminal 2. For example, if the bandwidth of the network 3 is adequate, the server 1 may select a media content which has been encoded by an MPEG4 high bit-rate method, and if the bandwidth of the network 3 is relatively scarce, select a media content which has been encoded by an MPEG4 low bit-rate method. As a result, a media content that has been optimally selected in accordance with the state of communications can be distributed from the server 1 to the terminal 2.

As described above, in the media contents distribution system according to the present embodiment, a media content or an execution program that has been optimally selected in accordance with the processing ability of a terminal or a state of communications can be distributed from the server to the terminal. Note that, since the selective distribution of a media content and the selective distribution of an execution program are separate functions, the server 1 may only have one of these functions.

Thus, the media contents distribution systems according to the fifth to seventh embodiments are based on the media contents distribution system according to the first embodiment, with a billing function, a middleware distribution function, and a selective distribution function of media contents and the like being additionally introduced. It will be appreciated that any combination of the above three functions may be additionally introduced to the media contents distribution system according to the first embodiment. It will also be appreciated that any combination of the above three functions may be additionally introduced to the media contents distribution system according to the second, third, or the fourth embodiment, as applied in the first embodiment.

The above-described first to seventh embodiments and the variants thereof illustrate the case where a media content and an execution program (and if necessary, a usage rule) are distributed from a single server 1. Alternatively, the distribution functions for these three kinds of data may be dispersed over a plurality of servers. For example, the media contents distribution system may comprise first to third servers, such that the first server distributes media contents, the second server distributes execution programs, and the third server distributes usage rules.

While the invention has been described in detail, the foregoing description is in all aspects illustrative and not restrictive. It is understood that numerous other modifications and variations can be devised without departing from the scope of the invention.

What is claimed is:

1. A media contents distribution system for distributing a media content via a communication network, said media contents distribution system comprising a server and a terminal, wherein said server comprises:
   a condition setting unit operable to determine a usage rule for the media content to be transmitted to said terminal;
   a server-side storage unit operable to store the media content, an execution program for processing the media content, and the usage rule for the media content; and
   a transmission unit operable to transmit the media content and the execution program stored in said server-side storage unit to said terminal prior to using the media content, and at a time of using the media content, transmit the usage rule stored in said server-side storage unit to said terminal;
wherein said terminal comprises:
   a reception unit operable to receive the media content, the execution program, and the usage rule from said server;
   a terminal-side storage unit operable to store the media content and the execution program received by said reception unit;
   a control unit operable to, at the time of using the media content, permit use of the media content within bounds of the usage rule determined by said condition setting unit; and
   a processing unit operable to execute the execution program stored in said terminal-side storage unit to process the media content stored in said terminal-side storage unit; and
wherein the execution program checks with said control unit whether or not use of the media content received by said reception unit is permitted, and processes the media content only when use of the media content is permitted.

2. The media contents distribution system according to claim 1, wherein, when said condition setting unit determines a new usage rule for the media content stored in said terminal-side storage unit, said server-side storage unit is operable to update the usage rule stored therein with the new usage rule determined by said condition setting unit.

3. The media contents distribution system according to claim 1, wherein, when a new execution program is needed for using the media content at said terminal;
   said condition setting unit is operable to determine a new usage rule for the media content stored in said terminal-side storage unit;
   said server-side storage unit is operable to update the usage rule stored therein with the new usage rule determined by said condition setting unit;
   said transmission unit is operable to transmit the new execution program stored in said server-side storage unit to said terminal;
   said reception unit is operable to receive the new execution program from said server; and
   said terminal-side storage unit is operable to update the execution program stored therein with the new execution program received by said reception unit.

4. A media contents distribution system for distributing a media content via a communication network, said media contents distribution system comprising a server and a terminal, wherein said server comprises:
   a condition setting unit operable to determine a usage rule for the media content to be transmitted to said terminal;
   a server-side storage unit operable to store the media content and an execution program for processing the media content; and
   a transmission unit operable to transmit the execution program stored in said server-side storage unit and the usage rule determined by said condition setting unit to said terminal prior to using the media content, and during use of the media content, transmit the media content stored in said server-side storage unit to said terminal;
wherein said terminal comprises:
   a reception unit operable to receive the media content, the execution program, and the usage rule from said server;
   a terminal-side storage unit operable to store the execution program and the usage rule received by said reception unit;
   a control unit operable to, at a time of using the media content, permit use of the media content within bounds of the usage rule determined by said condition setting unit; and
   a processing unit operable to, concurrently as said reception unit receives the media content, execute the execution program stored in said terminal-side storage unit to process the media content received by said reception unit; and
wherein the execution program checks with said control unit whether or not use of the media content received by said reception unit is permitted, and processes the media content only when use of the media content is permitted.

5. The media contents distribution system according to claim 4, wherein, when said condition setting unit determines a new usage rule for the media content to be transmitted to said terminal;
   said transmission unit is operable to transmit the new usage rule determined by said condition setting unit to said terminal;
   said reception unit is operable to receive the new usage rule from said server; and
   said terminal-side storage unit is operable to update the usage rule stored therein with the new usage rule received by said reception unit.

6. The media contents distribution system according to claim 4, wherein, when a new execution program is needed for using the media content at said terminal;
- said condition setting unit is operable to determine a new usage rule for the media content to be transmitted to said terminal;
- said transmission unit is operable to transmit the new execution program stored in said server-side storage unit and the new usage rule determined by said condition setting unit to said terminal;
- said reception unit is operable to receive the new execution program and the new usage rule from said server; and
- said terminal-side storage unit is operable to update the execution program and the usage rule stored therein, with the new execution program and the new usage rule received by said reception unit, respectively.

7. A media contents distribution system for distributing a media content via a communication network, said media contents distribution system comprising a server and a terminal,
wherein said server comprises:
- a condition setting unit operable to determine a usage rule for the media content to be transmitted to said terminal;
- a server-side storage unit operable to store the media content, an execution program for processing the media content, and the usage rule determined by said condition setting unit; and
- a transmission unit operable to transmit the execution program stored in said server-side storage unit to said terminal prior to using the media content, and at a time of using the media content, transmit the usage rule stored in said server-side storage unit to said terminal, and during use of the media content, transmit the media content stored in said server-side storage unit to said terminal;

wherein said terminal comprises:
- a reception unit operable to receive the media content, the execution program, and the usage rule from said server;
- a terminal-side storage unit operable to store the execution program received by said reception unit;
- a control unit operable to, at the time of using the media content, permit use of the media content within bounds of the usage rule determined by said condition setting unit; and
- a processing unit operable to, concurrently as said reception unit receives the media content, execute the execution program stored in said terminal-side storage unit to process the media content received by said reception unit; and
wherein the execution program checks with said control unit whether or not use of the media content received by said reception unit is permitted, and processes the media content only when use of the media content is permitted.

8. The media contents distribution system according to claim 7, wherein, when said condition setting unit determines a new usage rule for the media content to be transmitted to said terminal, said server-side storage unit is operable to update the usage rule stored therein with the new usage rule determined by said condition setting unit.

9. The media contents distribution system according to claim 7, wherein, when a new execution program is needed for using the media content at said terminal;
- said condition setting unit is operable to determine a new usage rule for the media content to be transmitted to said terminal;
- said server-side storage unit is operable to update the usage rule stored therein with the new usage rule determined by said condition setting unit;
- said transmission unit is operable to transmit the new execution program stored in said server-side storage unit to said terminal;
- said reception unit is operable to receive the new execution program from said server; and
- said terminal-side storage unit is operable to update the execution program stored the rein with the new execution program received by said reception unit.

10. A terminal for receiving a media content distributed from a server via a communication network, said terminal comprising:
- a reception unit operable to, prior to using the media content, receive the media content from the server and an execution program for processing the media content from the server or a second server, and at a time of using the media content, receive a usage rule for the media content;
- a storage unit operable to store the media content and the execution program received by said reception unit;
- a control unit operable to, at the time of using the media content, permit use of the media content within bounds of the usage rule determined by the server, the second server or a third server; and
- a processing unit operable to execute the execution program stored in said storage unit to process the media content stored in said storage unit,
wherein the execution program checks with said control unit whether or not use of the media content received by the reception unit is permitted, and processes the media content only when use of the media content is permitted.

11. A terminal for receiving a media content distributed from a server via a communication network, said terminal comprising:
- a reception unit operable to, prior to using the media content, receive an execution program for processing the media content from the server or a second server and a usage rule for the media content from the server, the second server or a third server, and during use of the media content, receive the media content from the server;
- a storage unit operable to store the execution program and the usage rule received by said reception unit;
- a control unit operable to, at the time of using the media content, permit use of the media content within bounds of the usage rule determined by the server, the second server or the third server; and
- a processing unit operable to, concurrently as said reception unit receives the media content, execute the execution program stored in said storage unit to process the media content received by said reception unit,
wherein the execution program checks with said control unit whether or not use of the media content received by the reception unit is permitted, and processes the media content only when use of the media content is permitted.

12. A terminal for receiving a media content distributed from a server via a communication network, said terminal comprising:
- a reception unit operable to receive, prior to using the media content, an execution program for processing the media content from the server or a second server, and at a time of using the media content, receive a usage rule for the media content from the server, the second server or a third server, and during use of the media content, receive the media content from the server;

a storage unit operable to store the execution program received by said reception unit;

a control unit operable to, at the time of using the media content, permit use of the media content within bounds of the usage rule determined by the server, the second server or the third server; and a processing unit operable to, concurrently as said reception unit receives the media content, execute the execution program stored in said storage unit to process the media content received by said reception unit, wherein the execution program checks with said control unit whether or not use of the media content received by the reception unit is permitted, and processes the media content only when use of the media content is permitted.

* * * * *

UNITED STATES PATENT AND TRADEMARK OFFICE
CERTIFICATE OF CORRECTION

PATENT NO. : 7,627,686 B2  Page 1 of 1
APPLICATION NO. : 11/826179
DATED : December 1, 2009
INVENTOR(S) : Toshihiko Munetsugu et al.

It is certified that error appears in the above-identified patent and that said Letters Patent is hereby corrected as shown below:

In the Claims

In column 32, claim 9, line 10, "execution program stored the rein with the new" should read --execution program stored therein with the new--.

Signed and Sealed this

Eleventh Day of May, 2010

David J. Kappos
*Director of the United States Patent and Trademark Office*